United States Patent
Takada

(10) Patent No.: US 8,090,094 B2
(45) Date of Patent: Jan. 3, 2012

(54) ECHO CANCELLER

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 835 days.

(21) Appl. No.: 12/085,222

(22) PCT Filed: Nov. 24, 2006

(86) PCT No.: PCT/JP2006/323398
§ 371 (c)(1),
(2), (4) Date: May 20, 2008

(87) PCT Pub. No.: WO2007/072650
PCT Pub. Date: Jun. 28, 2007

(65) Prior Publication Data
US 2009/0257579 A1    Oct. 15, 2009

(30) Foreign Application Priority Data
Dec. 22, 2005    (JP) .................................. 2005-370171

(51) Int. Cl.
*H04M 9/08*    (2006.01)
(52) U.S. Cl. .................................................. 379/406.04
(58) Field of Classification Search ............... 379/406.04
See application file for complete search history.

(56) References Cited

U.S. PATENT DOCUMENTS

| 5,592,548 | A | 1/1997 | Sih |
| 5,828,657 | A | 10/1998 | Betts et al. |
| 6,434,110 | B1 * | 8/2002 | Hemkumar ................ 370/201 |
| 6,496,581 | B1 * | 12/2002 | Finn et al. ................ 379/406.01 |

FOREIGN PATENT DOCUMENTS

| JP | 09-130315 |   | 5/1997 |
| JP | 10-313269 | A | 11/1998 |
| JP | 2000-295641 |   | 10/2000 |
| JP | 2002-280938 |   | 9/2002 |
| JP | 2003-324370 |   | 11/2003 |
| JP | 2005-110307 |   | 4/2005 |
| JP | 2005-217547 |   | 8/2005 |

* cited by examiner

*Primary Examiner* — Alexander Jamal
(74) *Attorney, Agent, or Firm* — Rabin & Berdo, P.C.

(57) ABSTRACT

An echo canceller is capable of reducing echo feeling in a conversation even if a tone signal is input. The echo canceller of this invention judges whether a far-end input signal is a calling control tone signal or not, and if that is the case, resets a coefficient of an adaptive filter. An echo canceller of another aspect judges whether a far-end input signal is a predetermined kind of a tone signal or not, and stops the update of the coefficient of the adaptive filter if the result is affirmative and an amount of echo cancellation is not larger than a threshold value. Further, when the tone signal ends, the echo canceller compares amounts of echo cancellation before and after the end of the tone signal, in accordance with a result of the comparison, restart the update of the coefficient of the adaptive filter after resetting the coefficient of the adaptive filter, or restarts the update of the coefficient of the adaptive filter without resetting the coefficient of the adaptive filter. Moreover, notch filters may be provided to eliminate a tone signal frequency component at input stages of the adaptive filter and the adder for echo cancellation.

17 Claims, 12 Drawing Sheets

FIG.6

| FREQUENCY | SIGNAL KIND |
|---|---|
| 400(Hz) | DT、RBT、BT、OR THE LIKE |
| 2100(Hz) | FAX COMMUNICATION START TONE |

FIG.8

| NUMBER (KIND_TONE) | SIGNAL KIND | FREQUENCY (Hz) |
|---|---|---|
| 1 | DT | 400 |
| 2 | RBT | 400 |
| 3 | BT | 400 |
| 4 | FAX | 2100 |

FIG.10

| NUMBER | SIGNAL KIND (KIND_TONE) | LOW GROUP FREQUENCY (Hz) | HIGH GROUP FREQUENCY (Hz) |
|---|---|---|---|
| 5 | DTMF 1 | 697 | 1208 |
| 6 | DTMF 2 | 697 | 1336 |
| 7 | DTMF 3 | 697 | 1477 |
| 8 | DTMF 4 | 770 | 1208 |
| 9 | DTMF 5 | 770 | 1336 |
| 10 | DTMF 6 | 770 | 1477 |
| 11 | DTMF 7 | 852 | 1208 |
| 12 | DTMF 8 | 852 | 1336 |
| 13 | DTMF 9 | 852 | 1477 |

| 14 | DTMF * | 941 | 1208 |
|---|---|---|---|
| 15 | DTMF 0 | 941 | 1336 |
| 16 | DTMF # | 941 | 1477 | dd
ECHO CANCELLER

FIELD OF THE INVENTION

The present invention relates to an echo canceller and can be applied to an echo canceller provided in, for example, a VoIP (Voice over Internet Protocol) terminal device, to which a telephone is connected.

BACKGROUND OF THE INVENTION

Echo components in a hybrid circuit are generated by a reception signal flowing into a transmission signal path through the hybrid circuit. An echo canceller cancels the echo components, thereby preventing degradation in voice quality due to the echo components. The echo components arise when the reception signal is a voice signal, but they also arise when the reception signal is a tone signal.

A conventional echo canceller which avoids false convergence resulting from presence of a tone signal is disclosed in, for example, Patent Document 1.

Patent Document 1 is Japanese Patent Application Kokai (Laid Open) Publication No. 2005-110307.

DISCLOSURE OF THE INVENTION

Problems to be Solved by the Invention

However, the conventional echo canceller has the following problems 1 to 4.

(Problem 1)

The Echo Canceller in Patent Document 1 can Judge whether a filter coefficient conforms to a tone frequency characteristic, only after a tone signal has been input to an adaptive filter and the filter coefficient has been changed so as to have a tone-like character. For this reason, this echo canceller takes a certain time to detect a tone signal and cannot promptly take measures for echo cancellation when a tone signal begins to be received. Furthermore, since the filter coefficient set on the basis of a tone signal is inappropriate as an initial value used for setting the filter coefficient in accordance with a voice signal which is to be received subsequently to the tone signal, an echo in a voice signal cannot be canceled immediately when the voice signal begins to be received, thereby degrading call quality.

(Problem 2)

FIG. 1A shows a time response signal of an echo path with 50 samples of initial delay; FIG. 1B shows a filter coefficient when a filter coefficient of a coefficient register in the echo canceller converges; and FIG. 1C shows a frequency characteristic E1 of an echo path and a frequency characteristic R1 of the coefficient register after convergence, when a tone signal (dial tone 400 Hz) is input. As can be understood from FIGS. 1A and 1B, in the case of the echo path with 50 samples of initial delay, an adaptive filter coefficient of the echo canceller converges to a waveform which is very similar to that of the input tone signal. As can be understood from FIG. 1C, a part of a tone frequency (400 Hz) in the echo path constitutes a large component.

FIG. 2A shows a time response signal of an echo path with 10 samples of initial delay; FIG. 2B shows a filter coefficient when a filter coefficient of the coefficient register in the echo canceller converges; and FIG. 2C shows a frequency characteristic E2 of an echo path and a frequency characteristic R2 of the coefficient register after convergence, when a tone signal (dial tone 400 Hz) is input. As can be understood from FIGS. 2A and 2B, in the case of the echo path with 10 samples of initial delay, an adaptive filter coefficient of the echo canceller does not converge to a waveform which is very similar to that of the input tone signal. As can be understood from FIG. 2C, a peak of the frequency characteristic R2 of the coefficient register is not a tone frequency of 400 Hz but a frequency of 0 Hz.

However, not only in the case shown in FIGS. 1A to 1C (the case in which a coefficient filter appropriately converges in accordance with the input tone signal) but also in the case shown in FIGS. 2A to 2C (the case in which a coefficient filter does not appropriately converge in accordance with the input tone signal), the echo canceller exerts sufficient performance for echo cancellation from the input tone. In the example mentioned above, ERLE (Echo Return Loss Enhancement, i.e., a power ratio between a reception signal and a residual) indicates a sufficient amount of cancellation about 35 dB. In other words, in the case of FIGS. 2A to 2C, even though the echo path characteristic is not sufficiently estimated, the echo canceller exerts performance for echo cancellation as far as an input frequency. Such a phenomenon frequently occurs when an initial delay of an echo path is less than a tone period. More specifically, it is inevitable when an echo canceller and a hybrid circuit which is an echo source are closely disposed to each other, that is, when they are disposed in the same unit, for example. Unfortunately, it is usual that a hybrid circuit and an echo canceller are disposed in the same unit in a VoIP terminal device and so on. For this reason, in such a situation, the frequency characteristic of the coefficient register do not converge in accordance with an input tone and a tone-like character of the filter coefficient cannot be detected (as a result, it cannot be detected that an input signal is a tone signal).

For this reason, in the echo canceller of Patent Document 1, the coefficient register does not converge to a frequency of an input tone signal when the initial delay of the echo path is small and therefore desirable effects as an echo canceller cannot be obtained in most cases.

(Problem 3)

In a double-talk state where both of a speaker of a calling party or a call-out side and a speaker of a called party or a call-in side produce voices, transmission signals and reception signals are input to an echo canceller at the same time. Since, at this time, the echo canceller controls to stop the update of the coefficient of an adaptive filter, the double-talk detection is often implemented by monitoring the ERLE. The echo canceller in Patent Document 1 cannot perform correct double-talk judgment, because the echo canceller performs double-talk judgment by using a residual obtained through the use of an adaptive filter which has improperly converged in accordance with a tone (tone-converged) a tone signal as shown in the problem 1. Since, as shown in the problem 1, the echo canceller in Patent Document 1 performs double-talk judgment by using the residual obtained through the use of an adaptive filter which has improperly converged in accordance with a tone signal (tone-converged), the echo canceller cannot perform correct double-talk judgment. Further, since a step gain used for controlling a convergence speed of a coefficient is set to a large value during a predetermined period after the tone convergence, adaptation of the adaptive filter coefficient is performed under the highest following performance. Therefore, audio quality may remarkably degrade due to inappropriate cancellation. Moreover, since the adaptive filter starts to reconverge from an initial state that the adaptive filter improperly converges to the tone signal, the reconvergence takes a long time and a speaker hears echoes for a long time until the reconvergence, thereby degrading the call quality.

(Problem 4)

If the echo canceller in Patent Document 1 is used as it is, echo cancellation performance degrades when a telephone call is transferred to an extension telephone. Referring to FIG. 3, a problem at extension transfer which is the problem 4 of the echo canceller in Patent Document 1 will be described below.

It will be described that a call is originated from a telephone (far-end telephone) 100 in a call-out side base place or a calling party's place CO to a telephone (near-end telephone) 109 in a call-in side base place or a called party's place CI and, after conversation for a while, the call is transferred from the telephone 109 to a telephone 110 in the called party's place CI. As shown in FIG. 3, an echo canceller 120 includes a receiving input terminal (Rin) 103, a receiving output terminal (Rout) 104, a sending input terminal (Sin) 114, and a sending output terminal (Sout) 115. The echo canceller 120 also includes an adder 119, a double talk detector (DTD) 117, and an adaptive filter (ADF) 118. In FIG. 3, an echo canceller 121 estimates an echo, an echo path of which is a hybrid circuit (H1) 108, in accordance with an output from the adder 119 and an input of the receiving input terminal (Rin) 103 and estimates a coefficient of the adaptive filter (ADF) 118 so as to conform to the impulse response of the hybrid circuit 108. As a result of such estimation, a speaker signal from the telephone 100 passes through a hybrid circuit (H) 101 and is digitized at an analog-digital (A/D) converter 102 to be converted to a digital signal; the digital signal is converted to an analog signal at a digital-analog (D/A) converter 105; and the analog signal passes through a switch 106, is input to the hybrid circuit 108 performing two-wire conversion and then reaches the telephone 109. A part of the speaker signal to the telephone 109 is reflected at the hybrid circuit 108 to generate an echo signal y1; the echo signal y1 passes through a switch 112 and is input to an A/D converter 113 to be converted to a digital signal; and then the digital signal is input to the adder 119. The adder 119 receives a pseudo echo signal y' output from the adaptive filter 118. If the adaptive filter 118 has converged, the pseudo echo signal y' nearly equals to the echo signal y1, and therefore the echo signal y1 is canceled out by the pseudo echo signal y'.

An algorithm such as the publicly-known NLMS (Normalized Least Mean Square) is used for the update of a coefficient of the adaptive filter 118. Here, the update of a coefficient using the NLMS algorithm will be briefly described.

A filter coefficient $h_k(n)$ is updated in accordance with Equation (1) and Equation (2), where $x(n)$ is a voice signal which is sent from the far-end telephone 100 and received by the receiving input terminal, and $h_k(n)$ is a filter coefficient(s) of the adaptive filter 118.

$$h_k(n+1) = h_k(n) + \frac{\alpha}{\sum_{i=0}^{N-1} x^2(n-i)} \times e(n) \times (n-k) \quad (1)$$

$$e(n) = y_m(n) - y'(n) \ \{m = 1, 2\} \quad (2)$$

When the denominator of the second term in the right-hand side of Equation (1) is zero, an update amount of the coefficient is set to be equal to zero or the update of the coefficient is stopped. The filter coefficient $h_k(n)$ represents a tap coefficient of the k-th adaptive filter at the n-th sampling time. Further, a symbol $\alpha$ represents a step gain which is a constant for determining the convergence speed of the adaptive filter 118 and is within a range of $0<\alpha<2$. If a value of $\alpha$ is large, the convergence speed is fast, but a steady characteristic is greatly disturbed and is apt to be influenced by a noise. On the other hand, if a value of $\alpha$ is small, the convergence speed is slow, but the steady characteristic is not much disturbed and is not much influenced by a noise. Patent Document 1 shows that a value of the step gain is reduced after the adaptive filter 118 sufficiently converges.

For extension transfer, a call is temporarily established between the telephone 100 and the telephone 109 and the coefficient of the adaptive filter 118 converges under estimation of the hybrid circuit 108 to some degree. Here, if the adaptive filter 118 has completely converged, an echo cancellation residual $e(n)$ in Equation (2) is equal to zero. This state is approximately the same as the state when the update of the coefficient stops.

Four extension transfer cases, in which the call is subsequently transferred from the telephone 109 to the telephone 110 through the use of a private branch exchange device or the like, will be described below. At the occurrence of the call transfer, the switch 106 connects a terminal "a" to a terminal "a2" and the switch 112 connects a terminal "b" to a terminal "b2". A signal output from the D/A converter 105 passes through the terminal "a" and the terminal "a2" of the switch 106, and then a part of the signal is sent via a hybrid circuit 111 to the telephone 110. The other part of the signal is reflected at the hybrid circuit 111, sent as an echo signal y2 through the terminal "b2" and the terminal "b" of the switch 112 to the A/D converter 113, and sent from the A/D converter 113 to the Sin terminal 114. Next, an explanation will be made as to combinations of whether the convergence state of the echo canceller is good or bad and whether the change of the echo-path due to the call transfer is large or small.

(Extension Transfer Case 4A)

An extension transfer case 4A is a case where the adaptive filter 118 insufficiently converges and characteristics of the hybrid circuits 108 and 111 are almost the same.

In the extension transfer case 4A, i.e., the case of a state before the transfer, since the echo cancellation residual $e(n)$ in Equation (2) is not equal to zero, the update of the coefficient in Equation (1) is effectively implemented. That is, as shown in the echo canceller in Patent Document 1, if $x(n)$ is a signal with a tone-like character, the coefficient of the adaptive filter 118 is updated depending on the input $x(n)$ in accordance with Equation (1). As a result, the coefficient of the adaptive filter 118 converges so as to cancel the echo signal y1 with a tone-like character, rather than converges on the basis of the characteristic of the hybrid circuit 108. As a matter of course, the coefficient of the adaptive filter 118 converges to a different characteristic from the impulse response of the hybrid circuit 108, as shown in FIG. 1. After that, the call is transferred, the hybrid circuit 111 is connected, the telephone 110 is then connected, and a call is started.

In the extension transfer case 4A, the characteristic of the hybrid circuit can be considered to be the same before and after the transfer, but the coefficient of the adaptive filter 118 converges in accordance with the tone. After that, the voice signal $x(n)$ which is a signal having no tone-like character is input. At this time, the adaptive filter 118 estimates only components of the tone signal and the convergence state of the adaptive filter 118 does not reflect the response characteristic of the hybrid circuit as has been described in the section of the problem 2. For this reason, echoes of a voice signal having frequency components which is wider than a tone frequency cannot be cancelled concerning almost all components and are output from the adder 119. The output of the adder 119 is supplied to the double talk detector (DTD) 117 as shown in FIG. 3. The double talk detector 117 calculates a value of a ratio ERLE between the output of the adder and the input Rin(n) from the receiving input terminal and detects a double talk in accordance with a value of ERLE, or a value of change of ERLE. The value of ERLE is calculated as shown in Equation (3), for example.

$$ERLE(n) = 10 \times \text{LOG}_{10}\left(\frac{rin^2(n)}{e^2(n)}\right) \text{ (dB)} \quad (3)$$

As Patent Document 1 indicates, if a value of ERLE is large such as 30 dB, it is determined that e(n) is small enough and that convergence has been completed or convergence is possible; if a value of ERLE is small such as 6 dB, it is determined that e(n) is still large and there is a voice signal from the called party and the update of the coefficient of the adaptive filter 118 is stopped, for example. Alternatively, abrupt degradation of ERLE is detected, it is determined that there is the voice signal transmitted from the called party, and thereby the update of the coefficient of the adaptive filter is stopped.

However, as has been described above, immediately after the tone improper or false convergence, most of the echo components due to the voice signal input from the receiving input terminal are not canceled and thus a value of ERLE is small. Further, in view of change in ERLE, a value of ERLE due to the voice immediately after the tone is abruptly degraded. Accordingly, the double talk detector 117 undesirably judges that there is a voice signal from the called party and thereby improperly detects that a double-talk state occurs. As a result, the double talk detector 117 stops the update of the coefficient of the adaptive filter 118 and the adaptive filter 118 freezes the coefficient afterwards and maintains the frozen coefficient. That is, the update of the coefficient of the adaptive filter 118 freezes while an echo remains. Moreover, in the case of the hybrid circuits 108 and 111 whose responses have small initial delay, the coefficient of the adaptive filter 118 does not conform to the input tone-like character. That is, the adaptive filter 118 only reflects a characteristic being different from either the characteristic of the input signal or the characteristics of the hybrid circuits 108 and 111. As a result, recovery from the false convergence is impossible.

Even if the double-talk detection should be luckily avoided, the coefficient of the adaptive filter 118 reflects rather a tone signal than the characteristics of the hybrid circuits 108 and 111 and improperly converges for echo cancellation. Therefore, it is not appropriate for the convergence of the characteristic of the hybrid circuit 111 as initial setting for reconvergence of the adaptive filter 118, and therefore it causes long-duration reconvergence and echoes arise during the reconvergence.

(Extension Transfer Case 4B)

An extension transfer case 4B is a case where the adaptive filter 118 insufficiently converges and the characteristics of the hybrid circuits 108 and 111 are different.

A problem in the extension transfer case 4B is more distinguished than that in the extension transfer case 4A. This is because, after the tone false convergence, the characteristic of the hybrid circuit 111 is quite different from the characteristic of the hybrid circuit 108. The filter coefficient of the adaptive filter 118 which has once improperly converged due to a tone which was input to the hybrid circuit 108 does not in the least reflect the impulse response characteristic of the hybrid circuit 111 which is newly connected. For this reason, an echo cannot in the least be cancelled in a voice signal having wide frequency components after the tone signal, thereby making the echo remarkable. Moreover, the double talk detector 117 is inevitable to judge improperly. As a result, in the same manner as has been described in the extension transfer case 4A, the adaptive filter 118 undesirably freezes the update of the coefficient while an echo remains. Moreover, in the case of the hybrid circuits 108 and 111 whose responses have small initial delay, the coefficient of the adaptive filter 118 does not correspond to the tone-like character or tone component of the input signal, recovery from the frozen state is impossible. Therefore, a state in which an echo arises is undesirably maintained after the extension transfer.

(Extension Transfer Case 4C)

An extension transfer case 4C is a case where the adaptive filter 118 sufficiently converges and the characteristics of the hybrid circuits 108 and 111 are almost the same.

In the extension transfer case 4C, since the echo cancellation residual e(n) in Equation (2) is originally equal to zero and an update amount is zero, the update of the coefficient in accordance with Equation (1) is not performed. Moreover, as shown in Patent Document 1 as the echo canceller, the update of the coefficient is inhibited if a step gain is reduced depending on the convergence.

Actually, however, since there is a background noise in a near-end speaker (Sin speaker) side and the like, it is rare that the echo cancellation residual e(n) completely becomes zero. In such a case, if the tone signal continues to be input from the receiving input terminal 103 for a greatly long time, the coefficient of the adaptive filter 118 gradually converges to a value indicating a tone-like character. At this time, once the adaptive filter 118 improperly converges to the tone signal, a problem similar to that in the extension transfer case 4A arises. In the extension transfer case 4C, it is preferable to stop the update of the coefficient before the tone false convergence of the adaptive filter 118 proceeds, as opposed to the echo canceller of Patent Document 1 which detects a result of the false convergence of the adaptive filter 118.

(Extension Transfer Case 4D)

An extension transfer case 4D is a case where the adaptive filter 118 sufficiently converges and the characteristics of the hybrid circuits 108 and 111 are different.

Further, in the extension transfer case 4D, if a long-duration tone signal is input from the telephone 100, the coefficient of the adaptive filter 118 improperly converges due to the tone signal. Such problem that arises immediately after the tone false convergence is similar to that in the extension transfer case 4B. In the extension transfer case 4D, however, even if the update of the coefficient is stopped before the tone false convergence of the adaptive filter 118 proceeds, the characteristic of the hybrid circuit 111 after the extension transfer is different from the characteristic of the hybrid circuit 108 before the transfer, and therefore echo cancellation is scarcely possible after the transfer, in any event. For this reason, a value of ERLE becomes small. If a change of a value of ERLE is detected, it is so abruptly reduced after the transfer is performed that the double talk detector 117 improperly judges that the change in ERLE indicates a double-talk state. Moreover, even if the coefficient of the adaptive filter 118 is stopped before progress of the tone false convergence, it indicates that the coefficient which has been converged by a voice signal is frozen as it is. That is, in the echo canceller of Patent Document 1, it is analyzed that the coefficient of the adaptive filter 118 which is stopped to be updated has no tone-like character and a value of ERLE is small, recovery from the improper double-talk judgment is impossible. Therefore, the adaptive filter 118 in the echo canceller freezes the coefficient nevertheless the echo cannot be cancelled and echoes continuously occur after the transfer. In other words, inconvenience in the extension transfer case 4B arises if the false convergence occurs, and echoes continuously arise after the transfer if the update of the coefficient is stopped before the false convergence.

The present invention is made to solve the above-mentioned problems of the conventional art and its object is to provide an echo canceller which can reduce echo feeling in a subsequent conversation, even if a tone signal is received.

Means for Solving the Problem

An echo canceller of the present invention includes: an adaptive filter which generates a pseudo echo signal in accordance with a far-end input signal; an echo cancellation means which subtracts the pseudo echo signal from a near-end input signal; a tone-like character judgment means which judges whether the far-end input signal is a tone-like character signal or not; and a coefficient control means which causes the adaptive filter to reset a coefficient of the adaptive filter when the tone-like character judgment means judges that the far-end input signal is a tone-like character signal.

Further, an echo canceller according to another aspect of the present invention includes: an adaptive filter which generates a pseudo echo signal in accordance with a far-end input signal; an echo cancellation means which subtracts the pseudo echo signal from a near-end input signal; a tone-kind judgment means which judges whether the far-end input signal is a predetermined kind of tone signal or not; an echo-cancellation-amount calculation means which calculates an amount of echo cancellation of a signal output from the echo cancellation means; and an at-tone-input coefficient control means which causes the adaptive filter to stop the update of a coefficient of the adaptive filter in accordance with satisfaction of a predetermined condition for the amount of echo cancellation, when the tone-kind judgment means judges that the far-end input signal is the predetermined kind of tone signal.

It is preferable that when judging that the far-end input signal is a predetermined kind of tone signal, the tone-kind judgment means also detects an end of the tone signal, and the at-tone-input coefficient control means compares amounts of echo cancellation before and after timing when the tone-kind judgment means judged as the end of the tone signal, and in accordance with a result of the comparison, causes the adaptive filter to restart the update of the coefficient after resetting the coefficient of the adaptive filter, or forcefully causes the adaptive filter to restart the update of the coefficient without resetting the coefficient of the adaptive filter.

Further, it is preferable that the echo canceller includes: a first notch filter which removes a frequency component of a predetermined kind of tone signal from the far-end input signal toward the adaptive filter when the tone-kind judgment means judges that the far-end input signal is the predetermined kind of tone signal, the first notch filter being disposed at an input stage of the adaptive filter; or a second notch filter which removes a frequency component of a predetermined kind of tone signal from the near-end input signal toward the echo cancellation means when the tone-kind judgment means judges that the far-end input signal is the predetermined kind of tone signal, the second notch filter being disposed at an input stage of the echo cancellation means.

Moreover, the echo canceller may includes an arbitrary tone judgment means which judges whether the far-end input signal is an arbitrary tone signal or not, as a substitute for the tone-kind judgment means which judges whether the far-end input signal is a predetermined kind of tone signal or not.

Furthermore, an echo canceller according to another embodiment of the present invention includes: an adaptive filter which generates a pseudo echo signal in accordance with a far-end input signal; an echo-cancellation means which subtracts the pseudo echo signal from a near-end input signal; a tone-kind judgment means which judges whether the far-end input signal is a predetermined kind of tone signal or not; and a first notch filter which removes a frequency component of a predetermined kind of tone signal from the far-end input signal toward the adaptive filter when the tone-kind judgment means judges that the far-end input signal is the predetermined kind of tone signal, the first notch filter being disposed at an input stage of the adaptive filter.

It is preferable that a double-talk detection means, which detects a double-talk state of a far-end speaker and a near-end speaker, receives the near-end input signal which has passed through the first notch filter.

Further, it is preferable that the echo canceller includes: an echo cancellation means which subtracts the pseudo echo signal supplied from the adaptive filter, from the near-end input signal; and a second notch filter which removes a frequency component of the predetermined kind of tone signal from the near-end input signal toward the echo cancellation means when the tone-kind judgment means judges that the far-end input signal is the predetermined kind of tone signal, the second notch filter being disposed at an input stage of the echo cancellation means.

Moreover, an echo canceller according to another aspect of the present invention includes: an adaptive filter which generates a pseudo echo signal in accordance with a far-end input signal; an echo cancellation means which subtracts the pseudo echo signal from a near-end input signal; a tone-end judgment means which detects that the far-end input signal is a tone signal and judges an end of the tone signal; an echo-cancellation-amount calculation means which calculates an amount of echo cancellation in a signal output from the echo cancellation means; and an at-tone-end coefficient control means which causes the adaptive filter to stop update of a coefficient of the adaptive filter in accordance with satisfaction of a predetermined condition for the amount of echo cancellation, when the tone-end judgment means judges that the tone signal ends.

Effects of the Invention

According to an echo canceller of the present invention, there is an effect that echo feeling can be reduced in a subsequent conversation even if a tone signal is received.

BRIEF DESCRIPTION OF THE DRAWINGS

FIG. 6 is an explanatory diagram showing judgment operation of a signal kind judging unit in the first embodiment;

FIG. 8 is an explanatory diagram showing a relationship between results of judgment by the signal kind judging unit and outputs in the second embodiment;

FIG. 10 is an explanatory diagram showing a relationship between results of judgment by the signal kind judging unit and outputs in the third embodiment;

Figure 1A:
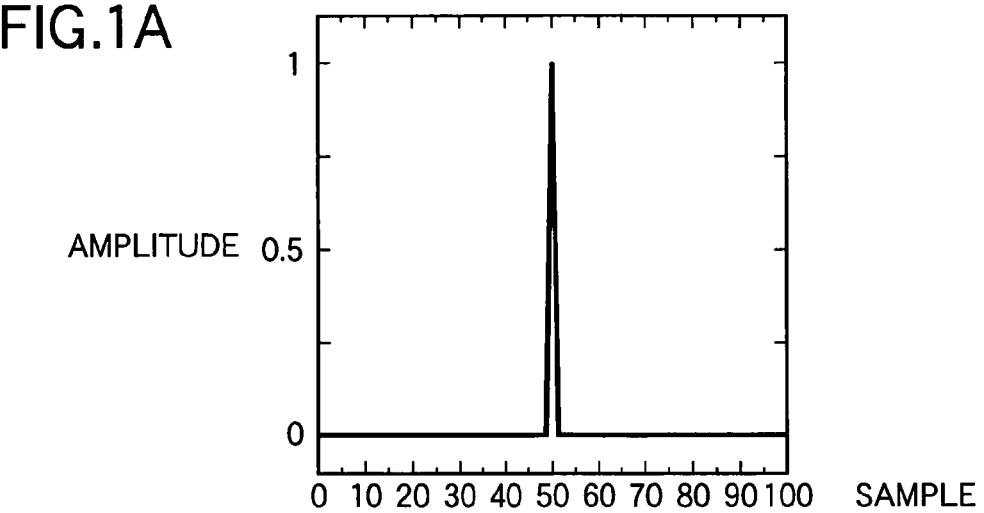
FIGS. 1A to 1C are diagrams showing characteristics when an initial delay of the echo path is 50 samples and are used for explaining the problems of the conventional art.
Figure 1B:
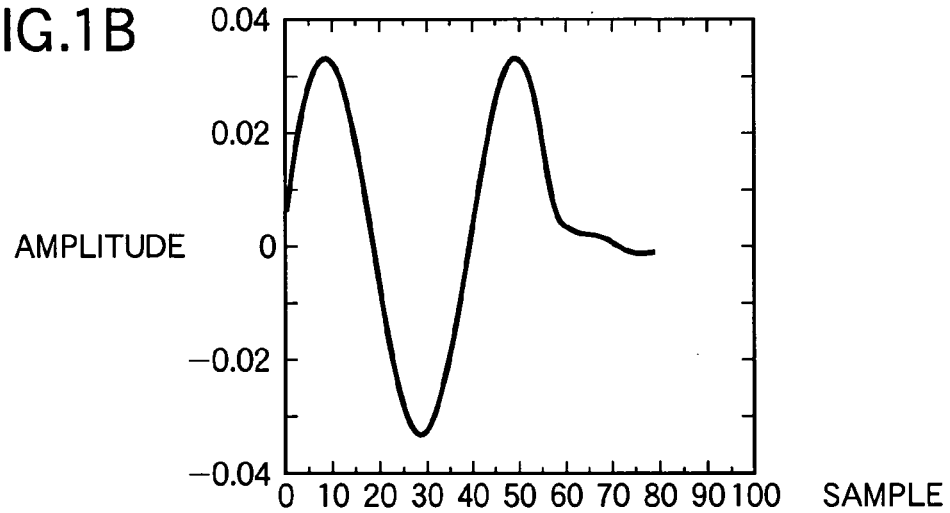
Figure 1C:
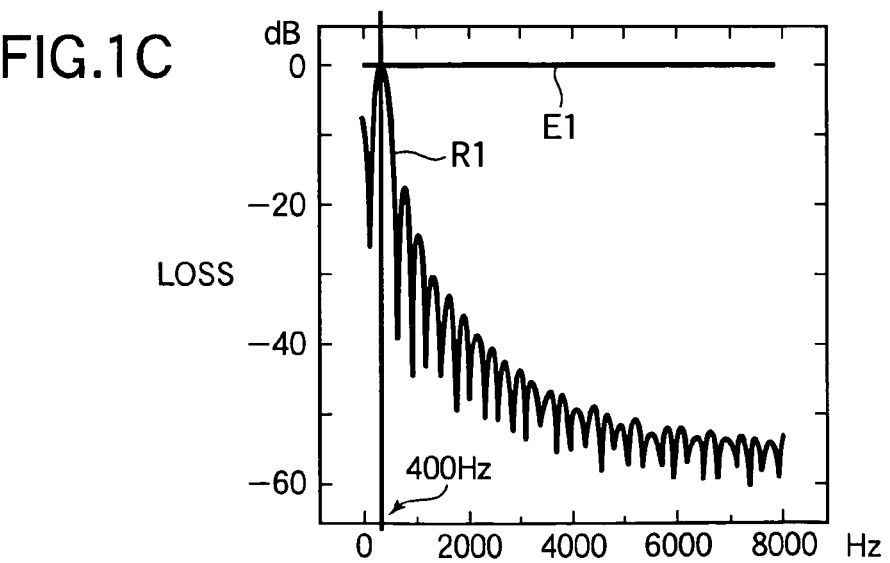
Figure 2A:
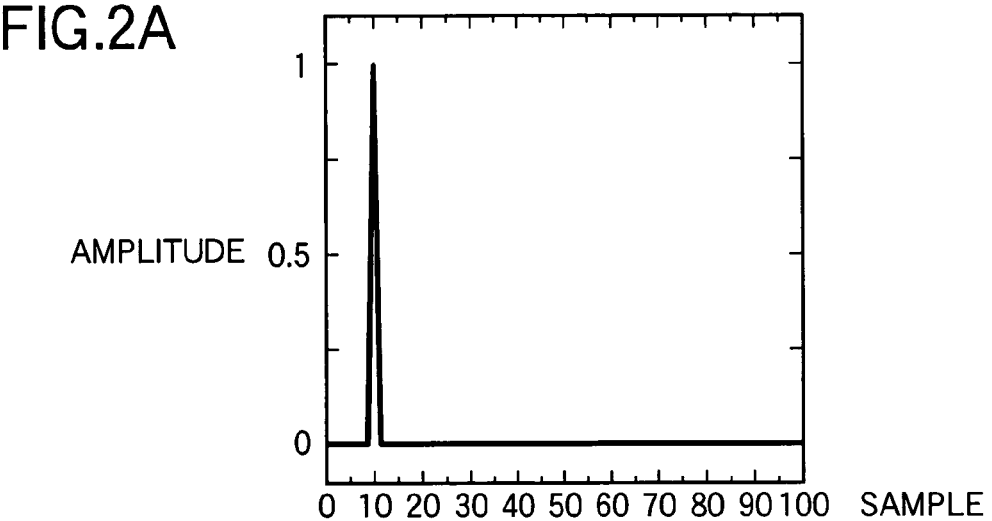
FIGS. 2A to 2C are diagrams showing characteristics when an initial delay of the echo path is 10 samples and are used for explaining the problems of the conventional art.
Figure 2B:
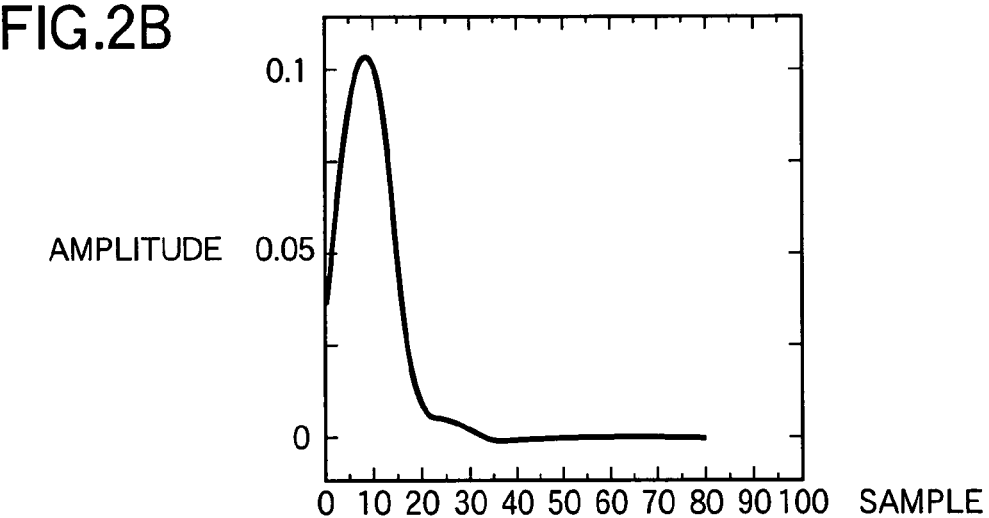
Figure 2C:
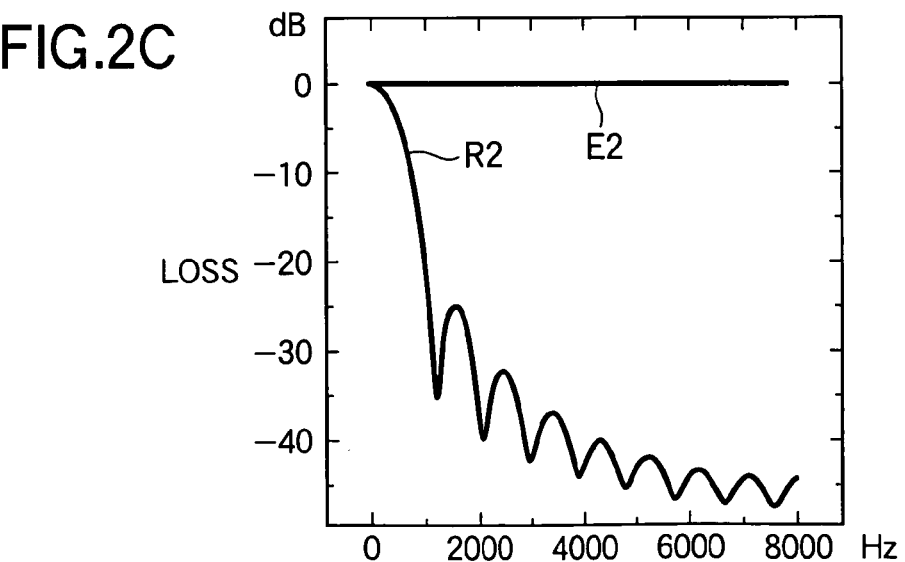
Figure 3:
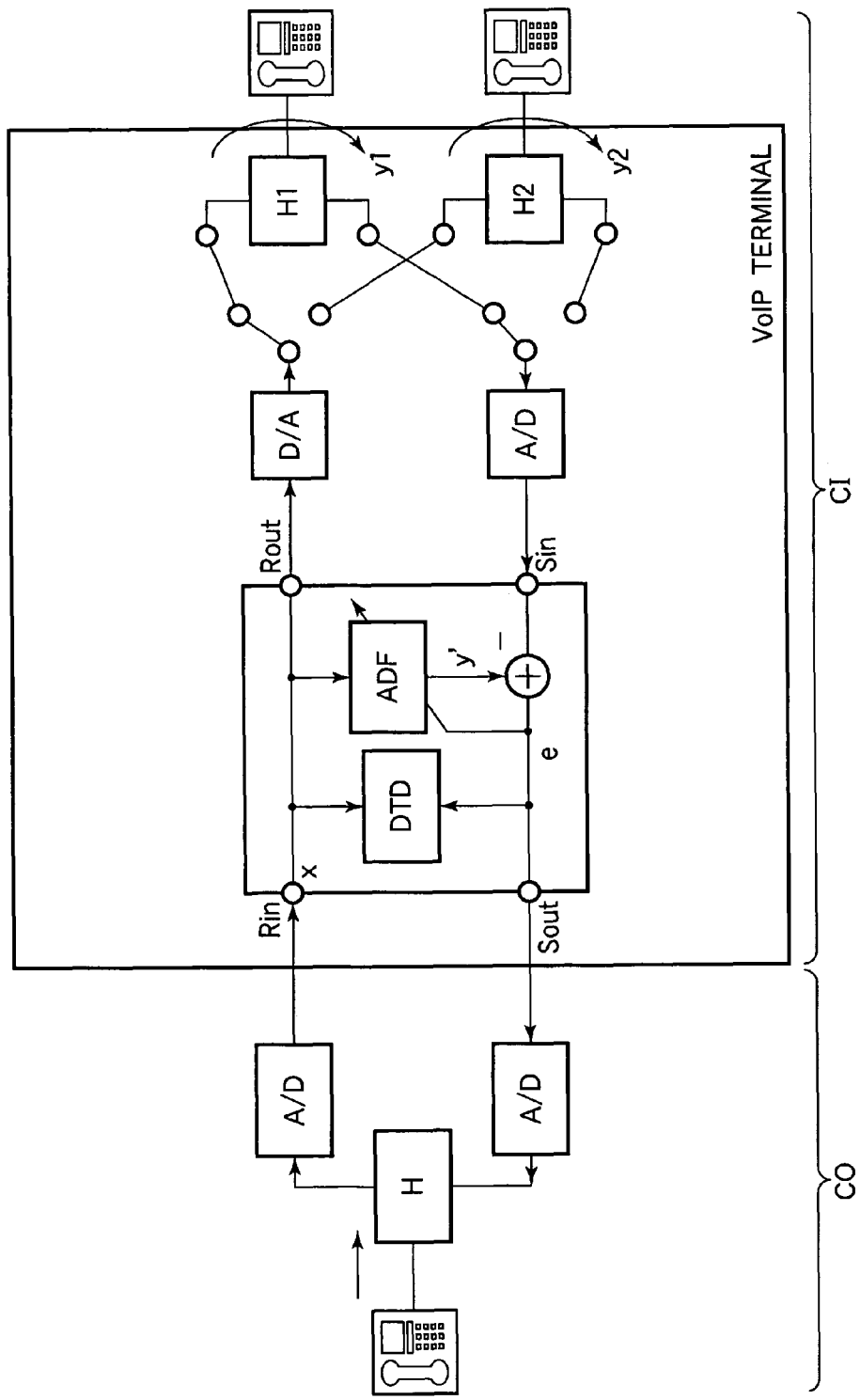
FIG. 3 is a block diagram showing a structure of a conventional telecommunication system.

EXPLANATION OF REFERENCE NUMERALS 1, 9 telephone;
2, 8 hybrid circuit;
4, 6 VoIP terminal device;
5 IP network;
12, 12A, 12B, 12C, 12D echo canceller;
13 adder;
14, 14B double talk detector;
15, 15B tone-like character judging unit;
16, 16A, 16B, 16D signal kind judging unit;
17, 17B coefficient controller;
18 adaptive filter;
21, 22 notch filter;
31 filter state judging unit;
32 echo-cancellation-amount calculator;
40 signal component judging unit;
CO calling party's place;
CI called party's place.

BEST MODE FOR CARRYING OUT THE INVENTION

《A》First Embodiment

An echo canceller according to the first embodiment of the present invention will be described with reference to the drawings. The echo canceller of the first embodiment has been made to solve the problems 1 and 2. The echo canceller of the first embodiment is intended to solve a problem that echoes cannot be appropriately cancelled at the beginning of a call (when a voice signal starts to be input after the tone signal) and echoes remarkably appear, due to convergence (false convergence) of a filter coefficient caused by a tone signal. The echo canceller of the first embodiment sets an initial value of a filter coefficient to be appropriate, when the echo canceller itself reconverges (when a filter coefficient converges at the beginning of a call).

<A-1> Structure in First Embodiment

Figure 4:
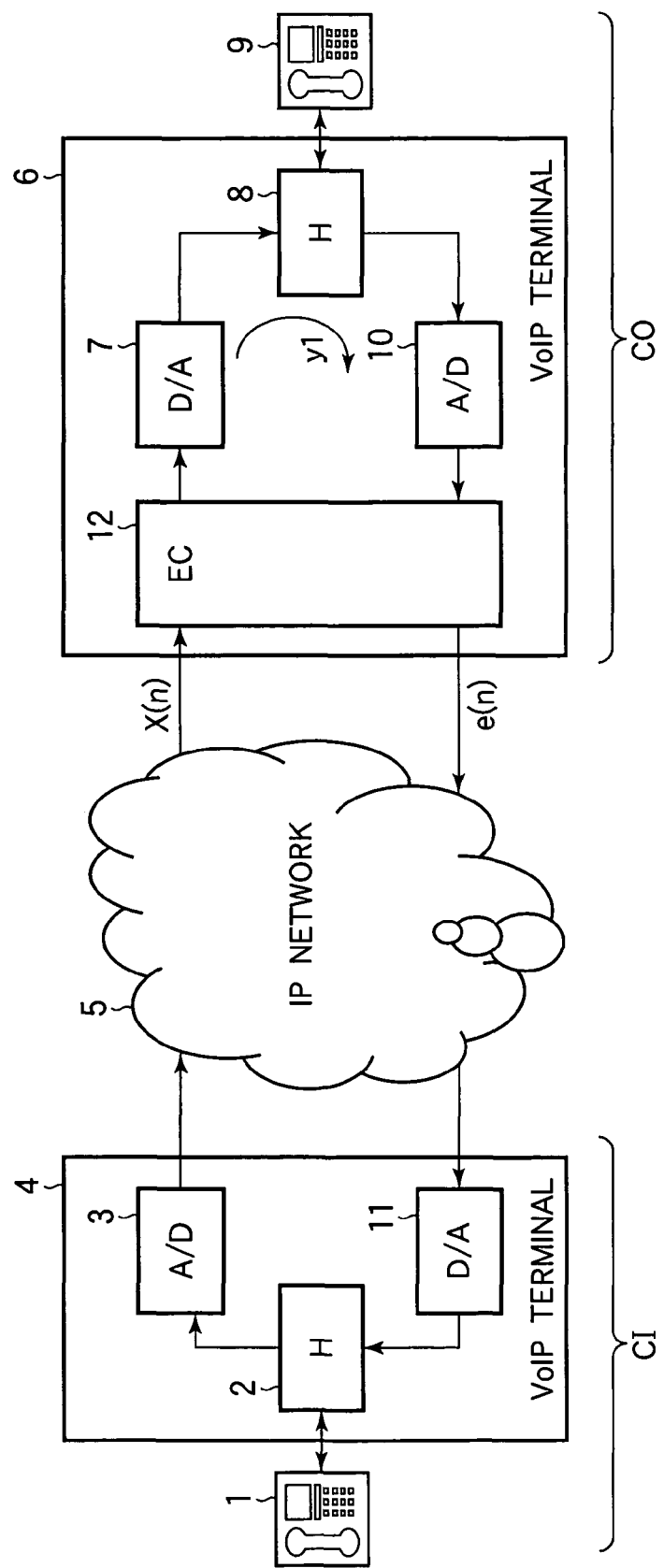
FIG. 4 is a block diagram showing a structure of a telecommunication system including an echo canceller according to the first embodiment of the present invention.

FIG. 4 is a block diagram showing a structure of a telecommunication system including an echo canceller (EC) 12 of the first embodiment.

The telecommunication system shown in FIG. 4 implements communication between an existing telephone 1 and another existing telephone 9 via an IP network 5. The telephone 1 is connected to a VoIP terminal device 4, and the telephone 9 is connected to a VoIP terminal device 6. The VoIP terminal device 4 is connected to the IP network 5, and the VoIP terminal device 6 is connected to the IP network 5. Communication between the telephone 1 and the telephone 9 is implemented through the VoIP terminal device 4, the IP network 5, and the VoIP terminal device 6. The telephone 1 may be accommodated in the VoIP terminal device 4 (i.e., they may be a single piece structure), and the telephone 9 may be accommodated in the VoIP terminal device 6 (i.e., they may be a single piece structure).

In FIG. 4, a reference symbol "CI" denotes a base place of a called party or callee (call-in side), and a reference symbol "CO" denotes a base place of a calling party or caller (call-out side). FIG. 4 shows a structure to prevent a call signal which arrives at the base place CO from the base place CI from flowing into a signal path which is directed toward the base place CI, as an echo at the base place CO.

As shown in FIG. 4, the VoIP terminal device 4 includes a hybrid circuit (H) 2 which is two-wire connected to the telephone 1; a digital-analog (D/A) converter 11 which digital-analog converts a digital call signal traveling toward the telephone 1 to output the converted signal to the hybrid circuit 2; and an analog-digital (A/D) converter 3 which analog-digital converts an analog call signal which has been output from the telephone 1 and has passed through the hybrid circuit 2. The VoIP terminal device 4 may accommodate the echo canceller.

Further, as shown in FIG. 4, the VoIP terminal device 6 includes the echo canceller 12 of the first embodiment; a hybrid circuit (H) 8 which is two-wire connected to the telephone 9; a digital-analog (D/A) converter 7 which digital-analog converts a digital call signal traveling toward the telephone 9 to output the converted signal to the hybrid circuit 8; and an analog-digital (A/D) converter 10 which analog-digital converts an analog call signal which has been output from the telephone 9 and has passed through the hybrid circuit 8 to output the converted signal to the echo canceller 12.

Figure 5:
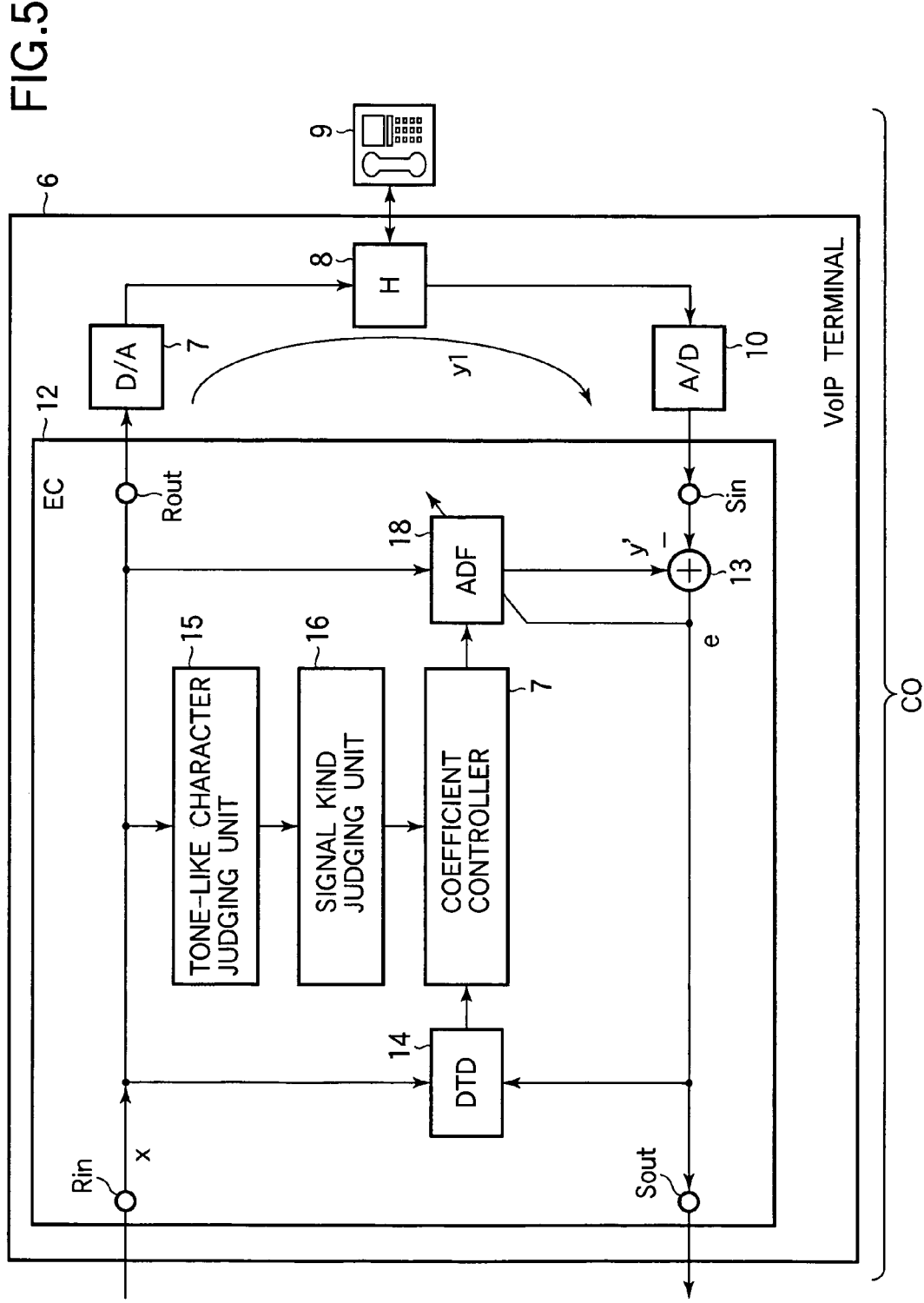
FIG. 5 is a block diagram showing a structure of the echo canceller and its peripheral equipment in the first embodiment of the present invention.

FIG. 5 is a block diagram showing a structure of the echo canceller 12 and its peripheral equipment in the first embodiment of the present invention. The parts in FIG. 5 that are the same as or correspond to the parts in FIG. 4 are assigned identical reference characters. Further, input/output signals to/from the echo canceller 12 of the first embodiment are digital signals.

As shown in FIG. 5, the echo canceller 12 includes a receiving input terminal Rin, a receiving output terminal Rout, a sending input terminal Sin, and a sending output terminal Sout. The echo canceller 12 also includes an adder 13, a double talk detector (DTD) 14, a tone-like character judging unit 15, a signal kind judging unit 16, a coefficient controller 17, and an adaptive filter (ADF) 18.

The adder 13 subtracts a pseudo echo signal y' from the signal input to the sending input terminal Sin, thereby eliminating the echo component of the signal input to the sending input terminal Sin.

The double talk detector 14 detects a talk state, such as a double-talk state, on the basis of the signal input to the receiving input terminal Rin and the signal output from the adder 13. Further, the double talk detector 14 clears an internal state in accordance with a control signal from the coefficient controller 17.

The tone-like character judging unit 15 judges whether the signal input to the receiving input terminal Rin is a signal having a tone-like character (e.g., a tone signal) or not. A signal having a tone-like character (also referred to as "a tone-like character signal") refers to a repetitive waveform signal having a predetermined period, such as various kinds of tones for call control (e.g., a dial tone (DT), a ring back tone (RBT), and a busy tone (BT)). The tone-like character signal includes not only a tone signal such as a dial tone but also a signal having a similar waveform to that of a tone signal. Any unit can be applied to the tone-like character judging unit 15 whatever it can judge whether a signal has a tone-like character or not. The tone-like character judging unit 15 described, for example, in Japanese Patent Application Kokai (Laid-open) Publication No. 2000-295641 is also available.

The signal kind judging unit 16 judges whether the signal is any of call control signals (tone signals for call control) or not, when the tone-like character judging unit 15 judges that an input signal is a tone signal. A method of the judgment will be described in detail later.

The coefficient controller 17 controls a filter coefficient of the adaptive filter 18 as described below. The coefficient controller 17 updates or clears the filter coefficient of the adaptive filter 18 in accordance with a result of detection by the double talk detector 14 described below and/or a result of judgment by the signal kind judging unit 16 described below.

The adaptive filter 18 generates a pseudo echo signal y' in accordance with an input signal from the receiving input terminal Rin and an internal filter coefficient and supplies the pseudo echo signal y' as a subtraction input to the adder 13. Further, the adaptive filter 18 uses Equations (1) and (2) for an echo-cancellation residual signal "e" which is output from the adder 13 to update the filter coefficient. However, when receiving instructions to clear the filter coefficient from the coefficient controller 17, the adaptive filter 18 clears the filter coefficient.

<A-2> Operation in First Embodiment

Next, the operation of the echo canceller 12 of the first embodiment as well as the operation of the telecommunication system including the echo canceller 12 will be described.

In the first embodiment, a case where the telephone 9 is on a side of a calling party or a call-out side and the telephone 1 is on a side of a called party or a call-in side is described. A speaker (not shown) using the telephone 9 at the call-out side base place CO lifts a handset of the telephone 9 to make a call to a speaker (not shown) using the telephone 1 at the call-in side base place CI and then a dial tone is output to the telephone 9. The dial tone is output from an IP gateway device, which is not shown in the drawing, between the VoIP terminal device 6 and the IP network 5 in FIG. 4, for example, and is input to the receiving input terminal Rin. Alternatively, the dial tone from a tone generator (not shown) provided inside the VoIP terminal device 6 may be input to the receiving input terminal Rin. A case where a dial tone is output from the IP gateway device which is not shown in the drawing and then is input to the receiving input terminal Rin will be described as follows. A dial tone is a beep that a user of a telephone hears as a beeping sound when he/she lifts a handset of the telephone and is a tone signal of a frequency of 400 Hz in Japan.

A reception signal (a digital signal, such as a tone signal and a call signal) input through the receiving input terminal Rin is input to the double talk detector 14, the tone-like character judging unit 15, the receiving output terminal Rout, and the adaptive filter 18.

The reception signal (digital signal), which is input through the receiving input terminal Rin and output from the receiving output terminal Rout as it is, is converted to an analog signal by the D/A converter 7, and the analog signal is input to the telephone 9 via the hybrid circuit 8. However, a part of the converted analog signal is reflected at the hybrid circuit 8. The signal reflected at the hybrid circuit 8 is input to the sending input terminal Sin via the A/D converter 10.

The input signal is input to the sending input terminal Sin, and after the adder 13 appropriately removes an echo component from the input signal, the input signal is supplied to the double talk detector 14, the adaptive filter 18, and the sending output terminal Sout. The supplied signal is output from the sending output terminal Sout to the IP network 5.

The tone-like character judging unit 15 judges whether the signal input to the tone-like character judging unit 15 is a tone-like character signal or not. If the input signal is judged as a tone-like character signal, the tone-like character judging unit 15 outputs a signal TON notifying that the input signal has a tone-like character to the signal kind judging unit 16. If the input signal is not judged as a tone-like character signal, the tone-like character judging unit 15 outputs a signal TOFF notifying that the input signal has no tone-like character to the signal kind judging unit 16. Further, the tone-like character judging unit 15 outputs the input signal as it is to the signal kind judging unit 16. If the signal input to the tone-like character judging unit 15 is a dial tone, the tone-like character judging unit 15 ordinarily judges that the signal has a tone-like character.

The signal kind judging unit 16 analyzes a frequency of the input signal using, for example, a publicly-known FFT (Fast Fourier Transform), a publicly-known zero-crossing method and the like. An example adopting the zero-crossing method, in which crossings of an input signal and a vertical axis of a signal amplitude are detected will be described below.

A case where a digital sampling frequency is 16 kHz will be described. In this case, if a sample number T1 of a period (interval) of the zero crossings in the same direction in the input signal waveform satisfies the following Equation (4), it is judged that the input signal is a signal of 400 Hz.

$$40-M1 \leq T1 \leq 40+M1 \quad (4)$$

In Equation (4), "40", being (16 kHz)/(400 Hz), is a sample number of a period of the zero crossings in the same direction (either "negative to positive" or "positive to negative"), when the input signal is a tone signal such as a sinusoidal signal. Further, "M1" is a parameter which defines a permissible improper range and may be a value of 5, for example. When the sample number T1 between a zero crossing and the next zero crossing of the input signal equals to or more than (40−M1) and at the same time equals to or less than (40+M1), for example, the input signal is judged to be a signal of 400 Hz.

Since a zero-crossing interval is (16000/f) samples for another signal of a frequency "f", an equation for detecting a frequency may be defined in the same manner. The following Equation (5) is used for judging whether the input signal is a signal of a frequency "f" or not.

$$(16000/f)-M1 \leq T1 \leq (16000/f)+M1 \quad (5)$$

The signal kind judging unit 16 judges whether the input signal is a known call control signal or not, on the basis of a signal TON notifying that the input signal has a tone-like character and a signal TOFF notifying that the input signal has no tone-like character, which are supplied from the tone-like character judging unit 15 and on the basis of frequency information obtained from the frequency analysis. If the input signal is judged as a call control signal, the signal kind judging unit 16 outputs a coefficient reset signal RST to the coefficient controller 17 and the double talk detector 14. The signal kind judging unit 16 outputs the coefficient reset signal RST, when it receives the signal TON notifying that the input signal has a tone-like character and the frequency information obtained from the frequency analysis indicates a predetermined frequency (e.g., 400 Hz or 2100 Hz), for example. For example, when a dial tone is received, since it has a predetermined frequency of 400 Hz, the signal kind judging unit 16, which cannot specify the received signal as a dial tone, outputs the coefficient reset signal RST.

FIG. 6 is an explanatory diagram showing a relationship between call control signals (tone signals) and frequencies. As shown in FIG. 6, a dial tone (DT), a ring back tone (RBT), a busy tone (BT) and the like are tone signals of 400 Hz, and a FAX communication start tone is a tone signal of 2100 Hz. Accordingly, the signal kind judging unit 16 stores, for example, "400" and "2100" in an internal memory in advance, reads the stored "400" or "2100" as a frequency "f" when Equation (5) is used, and then makes a judgment based on Equation (5). Although FIG. 6 shows two kinds of predetermined frequencies, three or more kinds of predetermined frequencies may also be stored.

When receiving the coefficient reset signal RST, the coefficient controller 17 outputs a clear instruction signal CL_T for instructing to clear a coefficient of the adaptive filter 18 to the adaptive filter 18. If not receiving the coefficient reset signal RST, the coefficient controller 17 does not output the clear instruction signal CL_T. When receiving the clear instruction signal CL_T, the adaptive filter 18 clears a filter coefficient. When no more clear instruction signal CL_T are received, the adaptive filter 18 performs the update of a filter coefficient again from the initial state.

Further, the clear instruction signal CL_T is supplied to the double talk detector 14, as has been described above. Although the double talk detector 14 detects a double talk by using ERLE, it clears an internal state when receiving the clear instruction signal CL_T.

As has been described above, in the echo canceller of the first embodiment, when the signal received by the receiving input terminal Rin is a call control signal such as a dial tone (DT), a coefficient of the adaptive filter 18 is cleared. Actually, after a calling party's speaker on a side of the telephone 9 ends dialing operation and human-voice signals start to flow through a call path, the signal kind judging unit 16 does not output the coefficient reset signal RST. Therefore, the adaptive filter 18 can begin to estimate an echo path from a preferable initial state for clearing the coefficient and can promptly implement the echo-path estimation. Moreover, the double talk detector 14 calculates ERLE, using a cancellation addition output of the adaptive filter 18 which starts to converge from a cleared preferable initial state and using the signal received at the receiving input terminal Rin, and thereby enables to realize correct double-talk detection.

<A-3> Effects in First Embodiment

In the echo canceller of the first embodiment, a call control signal which inevitably occurs at the beginning of a call and at other times is detected to clear a coefficient of the adaptive filter and to clear an internal state of the double talk detector. Thus, according to the echo canceller of the first embodiment, the false convergence due to a tone signal (call-control tone) can be avoided; the update of the adaptive filter of the echo canceller can be started from a desired initial state; the echo-path estimation can be promptly implemented; and an echo canceller with scarce degradation in cancellation efficiency due to a double talk can be obtained. Even if the initial delay of the echo path is short, an echo-free call of fine quality can be realized.

《B》Second Embodiment

An echo canceller according to the second embodiment of the present invention will be described with reference to the drawings. The echo canceller of the second embodiment is made to solve the problems 1, 2 and 3 in the echo canceller of Patent Document 1. The echo canceller of the second embodiment is proposed to solve a problem caused when a tone detector (FIG. 5) is disposed in the VoIP terminal device 6 in the first embodiment. The first embodiment effectively functions, if the tone detector is not disposed in the following locations.

If the echo canceller 12 is disposed inside of the VoIP terminal device 6 as shown in FIG. 5 (the first embodiment), a tone detector (not shown) is often provided on the output side of the sending output terminal Sout, aside from the tone-like character judging unit 15, in order to detect a push button signal (a DTMF (Dial Tone Multi Frequency) signal i.e., a PB signal) or the like received from the telephone 9.

However, if a signal supplied from the receiving input terminal Rin is detected as a tone signal and the echo canceller is reset not to perform echo cancellation as in the echo canceller 12 of the first embodiment, the following inconveniences arise.

For example, a part of the dial-tone signal input through the receiving input terminal Rin passes through the receiving output terminal Rout, the D/A converter 7, the hybrid circuit 8, and the A/D converter 10 and then is input to the sending input terminal Sin as an echo y1. As has been described above, when the telephone 9 outputs a DTMF signal s1 which is a push button signal, the echo y1 and the DTMF signal s1 are added at the hybrid circuit 8 to obtain an added signal. After that, it is input to the echo canceller 12 through the A/D converter 10 and then is supplied to the sending output terminal Sout without echo cancellation. It causes an inconvenience that the above-described tone detector (not shown) cannot appropriately detect a push button number due to obstruction by the superfluous echo signal y1 which is different from a DTMF signal. In a VoIP terminal device that the inconvenience caused by the above-described echo is not considered, such a problem frequently occurs and it causes a trouble that a phone number is quite difficult to be identified when a user lifts a handset and then pushes dial buttons while hearing a dial tone (a beeping sound). At worst, it causes a serious problem such that no telephone call can be made.

The echo canceller of the second embodiment has an effect that even if a signal such as a dial tone is received through the receiving input terminal Rin, a push button signal from the telephone 9 can be detected, in addition to the same effect as the echo canceller of the first embodiment.

<B-1> Structure in Second Embodiment

Figure 7:
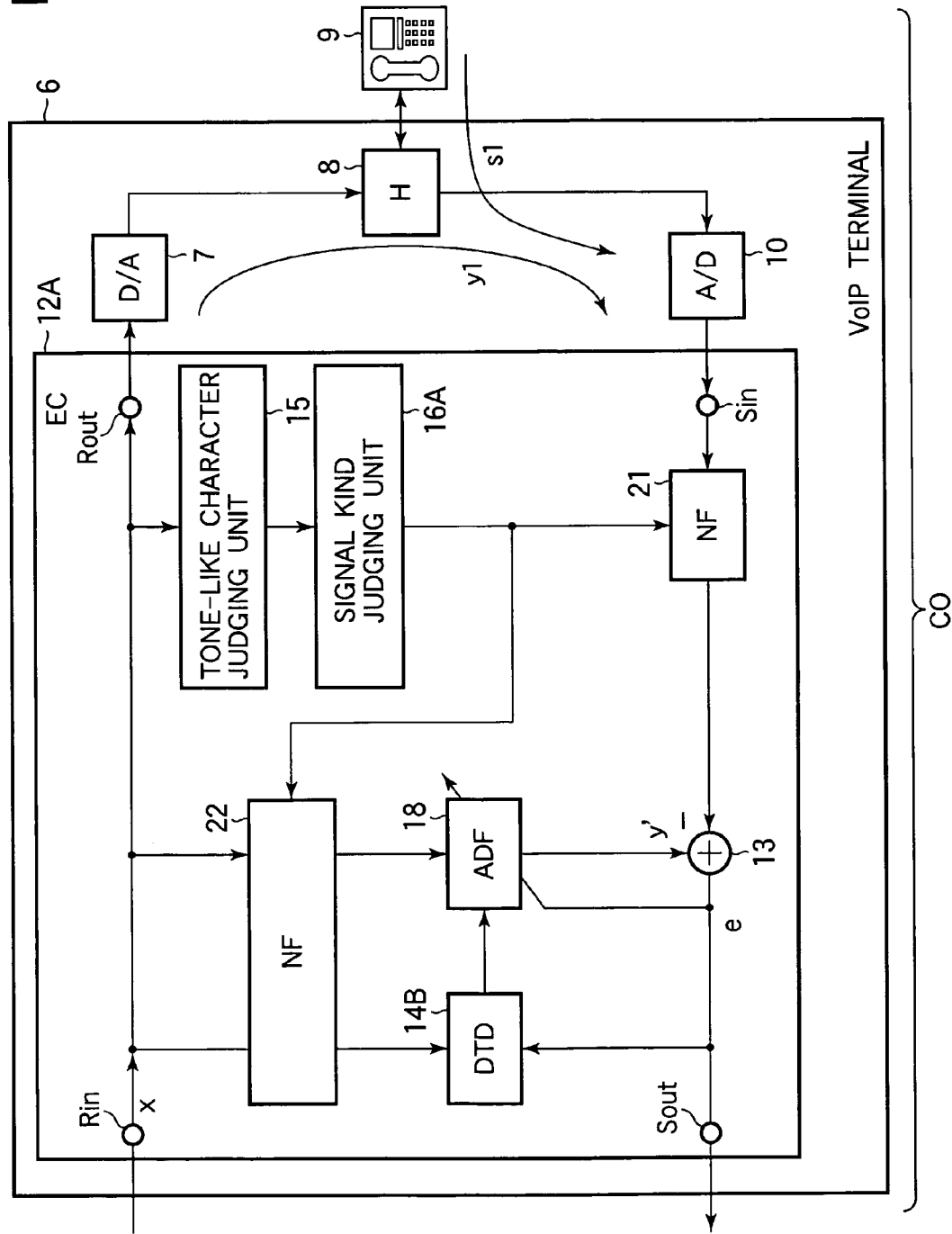
FIG. 7 is a block diagram showing a structure of an echo canceller and its peripheral equipment in the second embodiment of the present invention.

FIG. 7 is a block diagram showing a structure of an echo canceller 12A and its peripheral equipment in the second embodiment of the present invention. The parts in FIG. 7 that are the same as or correspond to the parts in FIG. 5 are assigned identical reference characters.

As shown in FIG. 7, the echo canceller (EC) 12A of the second embodiment includes an adder 13, a double talk detector (DTD) 14, a tone-like character judging unit 15, a signal kind judging unit 16A, and an adaptive filter (ADF) 18, in a similar manner to the first embodiment. Further, the echo canceller 12A of the second embodiment includes frequency band blocking filters, i.e., notch filters (NF) 21 and 22 as a substitute for the coefficient controller 17 (shown in FIG. 5) Furthermore, the signal kind judging unit 16A shown in FIG. 7 is slightly different in processing from the signal kind judging unit 16 of the first embodiment shown in FIG. 5.

The signal kind judging unit 16A in the second embodiment judges not only whether the input signal is a call control signal or not but also a specific kind of a call control signal of an input signal. For example, the signal kind judging unit 16A differentiates a dial tone and a busy tone, both of which have a frequency of 400 Hz, for the judgment. The signal kind judging unit 16A in the second embodiment, for example, compares a spectrum pattern which is determined by FFT with a reference spectrum pattern or compares an input signal waveform pattern with a reference waveform pattern after dynamic ranges are made uniform, to judge even a specific kind of a call control signal. When the input signal is a tone-signal and its specific kind is determined, the signal kind judging unit 16A supplies information of the kind to the notch filters 21 and 22.

The notch filter 21 is disposed between the sending input terminal Sin and the adder 13. The notch filter 22 is disposed between the receiving input terminal Rin and the double talk detector 14 and between the receiving input terminal Rin and the adaptive filter 18.

When receiving the kind information from the signal kind judging unit 16A, each of the notch filters 21 and 22 prevents a frequency component determined on the basis of the kind information from passing through itself. That is, the notch filters 21 and 22 are band blocking filters in which stop bands and the like are variable.

<B-2> Operation in Second Embodiment

Next, the operation of the echo canceller 12A of the second embodiment will be described with a particular emphasis on differences from the echo canceller of the first embodiment.

The signal kind judging unit 16A in the second embodiment judges a specific kind of an input signal to obtain a result of judgment, and then outputs the result of judgment, that is, a signal KIND_TONE which indicates a kind of the signal to both of the notch filters 21 and 22. If the input signal is other than a tone signal, that is, a non-tone signal, the signal kind judging unit 16A outputs no signal.

FIG. 8 is an explanatory diagram showing a relationship between the result of judgment by the signal kind judging unit 16A and the output signal KIND_TONE. The signal kind judging unit 16A internally stores information which indicates the relationship shown in FIG. 8 and outputs the signal KIND_TONE having a value in accordance with the result of judgment. In FIG. 8, "KIND_TONE=1" indicates that an input signal is a dial tone (DT); "KIND_TONE=2" indicates that an input signal is a ring back tone (RBT); "KIND_TONE=3" indicates that an input signal is a busy tone (BT); and "KIND_TONE=4" indicates that an input signal is FAX communication start tone (FAX). For a value KIND_TONE, any system is available as long as it indicates frequencies and kinds of a signal. Although it is different from the example of FIG. 8, a value indicating a frequency directly, such as a value of 400, may be directly used as an output value of a signal KIND_TONE. When an input signal is a non-tone signal, a signal KIND_TONE having a value indicating that it is a non-tone signal (e.g., 0) may be output.

When receiving the signal-kind judgment signal KIND_TONE, each of the notch filters 21 and 22 performs publicly-known notch filtering on the input signal so as to block a signal having a frequency corresponding to the signal KIND_TONE. If there is no signal KIND_TONE, each of the notch filters 21 and 22 allows the input signal to pass.

The notch filters 21 and 22 may be realized by selecting one or more filters among a plurality of filters which are prepared in advance, that is, among notch filters for blocking a signal having a predetermined frequency (e.g., 400 Hz) or another frequency and by using the selected filter/filters to block a signal having a frequency indicated by the signal KIND_TONE. The notch filters 21 and 22 may be frequency blocking filters which are adaptively provided in accordance with an input frequency as necessary. How to realize the notch filters 21 and 22 adaptively is as follows, for example: in a case where a stop frequency indicated by the signal KIND_ONE is 400 Hz and a sampling frequency is 16 kHz, an input signal is delayed by only 40 (=16 kHz/400 Hz) samples to obtain a delayed signal, the delayed signal is reversed (corresponding to 400-Hz period) to obtain a reversed signal, then the reversed signal is added to the input signal with no delay and thereby a filter removing 400-Hz tone can be realized. Thus, in accordance with a kind of signal and frequency information, whatever method can be applied if a filter removing a predetermined frequency can be realized. Thus, the notch filters 21 and 22 blocks passing of a call control signal corresponding to a kind of an input signal.

An output signal from the notch filter 21 is input to the adder 13 and echo cancellation is performed if necessary. On the other hand, an output signal from the notch filter 22 is input to the double talk detector 14 and the adaptive filter 14 to be used for double-talk detection and for generating a pseudo echo signal y' if necessary.

If the signal kind judging unit 16A judges a signal received from the receiving input terminal Rin as a tone signal, the notch filter 22 removes the tone signal and thus it is like that no signal is supplied to the adaptive filter 18 and the double talk detector 14. At this time, even if the telephone 9 outputs a DTMF signal s1 to the hybrid circuit 8, only the signal s1 which remains after the notch filter 21 blocks a frequency band and is input to the adder 13. On the other hand, the tone signal from the receiving input terminal Rin is blocked by the notch filter 22 and no signal is supplied to the adaptive filter 18 and the double talk detector 14. That is, at this time, a signal x(n) which is input to the adaptive filter 18 equals to zero, Equation (1) described above can be represented as Equation (6) and thus the update of the coefficient is substantially stopped.

$$h_k(n+1)=h_k(n)+0 \qquad (6)$$

In addition to such a control of the update of the coefficient, it yields:

$$\sum_{i=0}^{N-1} x^2(n-i) = 0$$

In order to avoid divergence of right-hand side of Equation (1), the update is stopped when:

$$\sum_{i=0}^{N-1} x^2(n-i) \leq \text{MIN(dB}m0) \times (\text{SUM OF PRODUCTS})$$

Further, it is described in the publicly known ITU-T (Telecommunication Standardization Sector of International Telecommunication Union) Recommendation G.711 that: (a 0-dBm0 reference value of dBm0)=0 dBm0.

For example, MIN (dBm0)=−50 (dBm0) can be applied, but MIN(dBm0) is not limited to this value.

As has been described above, through the use of the notch filters 21 and 22, the tone signal from the receiving input terminal Rin and an echo caused by the tone are blocked by the notch filters 21 and 22, and thereby a substantial amount of the update of the coefficient is zero and a coefficient value itself neither is updated nor changes even if the update of the coefficient of the adaptive filter 18 takes a significantly long time as the process requires. If its reference input is zero, the adaptive filter 18 outputs no signal and accordingly does not output any superfluous pseudo echo y' to the adder 13 likewise. Therefore, only the echo y1 is removed from the DTMF signal s1 which has entered the adder 13 and then the DTMF signal s1 is supplied to the sending output terminal Sout without degradation. An output signal (the DTMF signal) from the sending output terminal Sout is properly detected by the tone detector which is not shown in the drawing.

Moreover, since there is no false convergence due to the tone signal, an internal state of the double talk detector 14 is not disturbed, the double-talk detection can be properly performed on normal voices subsequent to the tone, and echoes can be removed.

<B-3> Effects in Second Embodiment

As has been described above, according to the echo canceller of the second embodiment, the following effects can be realized in addition to the effects of the echo canceller of the first embodiment. Even if a tone signal is provided from the receiving input terminal Rin and another tone signal such as a DTMF signal is output from an accommodated telephone in the opposite direction, the tone detector properly specifies the DTMF signal using an output of the echo canceller and it enables a user to make a telephone call. Moreover, according to the echo canceller of the second embodiment, there is no false convergence in a tone signal regardless of whether an initial delay of an echo path is large or small. Accordingly, an internal state of the double talk detector is not disturbed, the double-talk detection can be performed on normal voices subsequent to the tone, and en echo can be removed.

《C》Third Embodiment

An echo canceller of the third embodiment of the present invention will be described with reference to the drawings. The echo canceller of the third embodiment aims to realize telephone conversation without echoes, by automatically escaping from a state in which an echo cannot be cancelled when it is applied to a large system switching echo paths, such as a private branch exchange (PBX: Private Branch exchange) connection system in which switching extensions is performed. The echo canceller of the third embodiment is made to solve the above-described Problems 1 to 4 of the echo canceller in Patent Document 1.

<C-1> Structure in Third Embodiment

Figure 9:
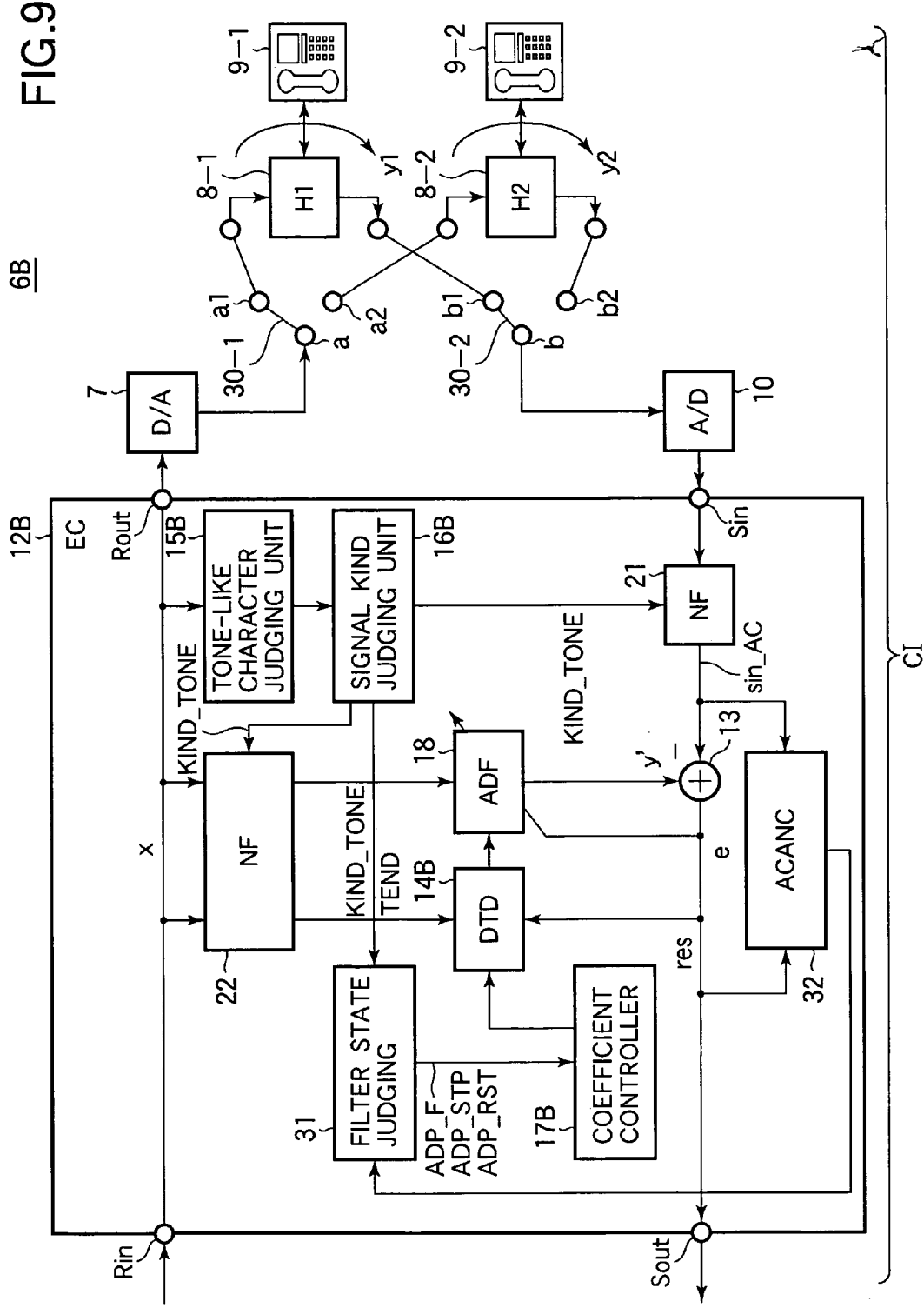
FIG. 9 is a block diagram showing a structure of an echo canceller and its peripheral equipment in the third embodiment of the present invention.

FIG. 9 is a block diagram showing a structure of an echo canceller 12B of the third embodiment of the present invention and its peripheral equipment. The parts in FIG. 9 that are the same as or correspond to the parts in FIG. 5 or FIG. 7 are assigned identical reference characters.

Referring to FIG. 9, the echo canceller 12B of the third embodiment is disposed in a PBX 6B having a function of transferring a call to another extension. The PBX 6B includes hybrid circuits 8-1 and 8-2 which have telephones 9-1 and 9-2 before and after a transfer, for example, and perform four-wire to two-wire conversion; a digital-analog (D/A) converter 7 which converts a digital signal traveling toward the telephone 9-1 or 9-2 to an analog signal; an analog-digital (A/D) converter 10 which converts an analog signal output from the telephone 9-1 or 9-2 to a digital signal; a switch 30-1 which supplies an output signal of the D/A converter 7 to the hybrid circuit 8-1 or 8-2; a switch 30-2 which supplies an output signal of the hybrid circuit 8-1 or 8-2 to the A/D converter 10; and the echo canceller 12B of the third embodiment. Further, the switches 30-1 and 30-2 work together to perform switching operation.

As shown in FIG. 9, the echo canceller (EC) 12B of the third embodiment includes an adder 13, a double talk detector (DTD) 14B, a tone-like character judging unit 15B, a signal kind judging unit 16B, a coefficient controller 17B, an adaptive filter (ADF) 18, notch filters (NF) 21 and 22, a filter state judging unit 31, and an echo-cancellation-amount calculator (ACANC) 32.

The adder 13, the adaptive filter 18, and the notch filters 21 and 22 are the same as those in the second embodiment.

The tone-like character judging unit 15B of the third embodiment has a function of judging a synthetic tone signal composed of two kinds of tone signals, such as a DTMF signal, in addition to the functions of the above-described embodiments.

The signal kind judging unit 16B of the third embodiment can distinguish between a synthetic tone signal composed of two kinds of tone signals, such as a DTMF signal, by utilizing a result of judgment by the tone-like character judging unit 15B. The signal kind judging unit 16B also judges end of the tone signal.

The echo-cancellation-amount calculator 32 calculates an amount of echo cancellation, on the basis of input and output signals of the adder 13, that is, an input signal having an echo component and an output signal on which the echo cancellation has been performed.

The filter state judging unit 31 judges a state of the adaptive filter 18 on the basis of a result of judgment by the signal kind judging unit 16B and a result of calculation by the echo-cancellation-amount calculator 32.

The coefficient controller 17B of the third embodiment determines contents of control, such as the stop of the update of the coefficient of the adaptive filter 18 and the clear of the coefficient, on the basis of a result of judgment by the filter state judging unit 31.

The double talk detector 14B in the third embodiment controls to update a coefficient of the adaptive filter 18 in accordance with the contents of the control determined by the coefficient controller 17B and a result of the detection of the double-talk obtained by itself.

<C-2> Operation in Third Embodiment

Next, the operation of the echo canceller 12B of the third embodiment will be described. Transferring a call from the telephone 9-1 at a called party to the telephone 9-2 at the called party will be described as follows. The following explanation concerns before and after the transfer and thus is based on a premise that the telephone call was already once established between a telephone at a calling party which is not shown in the drawing and the telephone 9-1 at the called party.

First, a voice signal output from the not-shown telephone at the calling party is converted to a digital signal by a not-shown A/D converter which is disposed in a previous stage of the echo canceller 12B, and the digital signal is input to a receiving input terminal Rin. The signal input to the receiving input terminal Rin is supplied to the notch filter 22 and the tone-like character judging unit 15B and is also output as it is from a receiving output terminal Rout to the D/A converter 7.

A signal converted by the D/A converter passes through the switch 30-1 to be input to the hybrid circuit 8-1, and then is supplied through the hybrid circuit 8-1 to the telephone 9-1. Further, a part of the converted signal is reflected at the hybrid circuit 8-1, thereby generating an echo signal y1. The echo signal y1 passes through the switch 30-2 to be input to the A/D converter 10, and is converted to a digital signal again to be supplied to a sending input terminal Sin of the echo canceller 12B.

A signal input to the sending input terminal Sin is supplied to the notch filter 21. Each of the notch filters 21 and 22 removes, as described below, a tone signal in accordance with an output of the signal kind judging unit 16B to obtain a signal Sin_AC as a result of the removal of the tone component, and then supplies the signal Sin_AC to the adder 13 as well as to the echo-cancellation-amount calculator 32. The adder 13 adds a pseudo echo y' to the signal Sin_AC which is obtained as a result of the removal of the tone component, thereby canceling an echo. The signal "res" output from the adder 13 is supplied to the double talk detector 14B and the echo-cancellation-amount calculator 32, and is also transmitted through a sending output terminal Sout toward a distant telephone of the calling party which is not shown in the drawing.

Here, the operation of the echo-cancellation-amount calculator 32 will be described. The echo-cancellation-amount calculator 32 calculates an amount of echo cancellation ACANC(n) in accordance with Equation (7), for example. In Equation (7), "n" indicates the n-th calculated value.

$$ACANC(n) = 10 \times \text{LOG}_{10}\left(\frac{\text{Sin\_AC}^2(n)}{res^2(n)}\right) \text{ (dB)} \qquad (7)$$

In Equation (7), the amount of echo cancellation ACANC(n) is calculated by multiplying a result of logarithmic calculation on a square ratio between Sin_AC(n) and res(n) by a value of 10.

However, in a case where attention is directed to broad behavior of a signal and slow change in a characteristic is necessary to be monitored, it may be available to perform logarithmic calculation, as shown in Equation (8), by picking up a predetermined sample number (e.g., 160 samples) of values for each of Sin_AC(n) and res(n), obtaining the sum of their squares and calculating a ratio of the both. An absolute value may be used as a substitute for the square. In Equation (8), "M" is a sample number to be averaged and may be a value of 160, for example, but the sample number is not limited to this value.

$$ACANC(n) = 10 \times \text{LOG}_{10}\left(\frac{\sum_{k=0}^{M-1} \text{Sin\_AC}^2(n-k)}{\sum_{k=0}^{M-1} res^2(n-k)}\right) \text{ (dB)} \qquad (8)$$

The point is that any calculation by the echo-cancellation-amount calculator 32 is available as long as it determines a ratio of levels or powers of the signals before and after the adder 13. The amount of echo cancellation ACANC(n) obtained in accordance with Equation (7) is determined as a result of logarithmic calculation on a square ratio the square of the signals before and after the adder 13. As the output signal "res" from the adder 13 is decreased in accordance with convergence of the echo canceller 12B, a value of the amount of echo cancellation ACANC(n) becomes larger. An initial value of the amount of echo cancellation ACANC(n) can be a value of 0, but it is not limited to this value. The echo-cancellation-amount calculator 32 supplies the calculated amount of echo cancellation ACANC(n) to the filter state judging unit 31.

Although in the third embodiment, in order to calculate the amount of echo cancellation, the echo-cancellation-amount calculator 32 calculates the amount of echo cancellation using the signals before and after the adder 13, another method is also available. For example, an amount of echo attenuation including an amount of attenuation in an echo path may be calculated from a signal at an arbitrary point between the receiving input terminal Rin and the receiving output terminal Rout and another signal at a point immediately after the adder 13.

The amount of echo cancellation ACANC(n) is supplied from the echo-cancellation-amount calculator 32 to, and a notch filter control signal KIND_TONE and a tone end signal TEND, described below, are supplied from the signal kind judging unit 16B to the filter state judging unit 31.

The operation of the tone-like character judging unit 15B and the signal kind judging unit 16B in the third embodiment will be described below.

The signal kind judging unit 16B receives a signal output from the tone-like character judging unit 15B. The tone-like character judging unit 15B in the third embodiment has a function of judging a DTMF signal, that is, a synthetic tone signal composed of two kinds of tone signals, in addition to the functions of the tone-like character judging unit in the second embodiment. The tone-like character judging unit 15B roughly divides a signal into two bands in advance, to judge a synthetic tone signal composed of two kinds of tone signals. It is based on that a DTMF signal is generated by synthesizing two kinds of tones: "high group" consisting of high frequency components and "low group" consisting of low frequency components.

In the third embodiment, the tone-like character judging unit 15B internally includes a bandpass filter which sets its passband from 1000 Hz to 1700 Hz in order to separate "high group"; another bandpass filter which sets its passband from 600 Hz to 980 Hz in order to separate "low group"; and another bandpass filter which sets its passband from 0 Hz to 500 Hz in order to separate "call control signal group" around 400 Hz as described in the first and second embodiments. The tone-like character judging unit 15B is structured to perform tone-frequency judgment on a band-divided signal by these bandpass filters, through the use of zero-crossing which is substantially the same as that described in the first embodiment.

The signal kind judging unit 16B in the third embodiment judges a kind of signal as in the second embodiment described above, of a signal having a frequency band of "call control signal group" (see FIG. 8). The signal kind judging unit 16B in the third embodiment judges a kind of a signal having both of the frequency bands of the "high group" and of the "low group", in accordance with internally stored information on a relationship between inputs, results of judgment and outputs, as shown in FIG. 10. It may be judged that a signal has no tone-like character when the "call control signal group" and the "high group" are detected, when the "call control signal group" and the "low group" are detected, and when the "call control signal group", the "high group" and the "low group" are detected, but it is not limited to this example.

When judging a kind of signal, the signal kind judging unit 16B outputs a result of the judgment, that is, a signal KIND_TONE indicating the kind of signal, to the notch filters 21 and 22 and the filter state judging unit 31. As the signal KIND_TONE, any kind of value system may be available whatever frequencies and kinds of signal are associated, such as values (number) for specifying the signals and the kinds of signal which are associated with each other as in FIG. 8 and FIG. 10.

In an example shown in FIG. 8 and FIG. 10, if KIND_TONE is a value of 1, it indicates a dial tone (DT); and if KIND_TONE is a value of 5, it indicates a DTMF signal "1".

Each of the notch filters 21 and 22 which receives the signal KIND_TONE from the signal kind judging unit 16B performs publicly-known filtering of frequency band blocking on the input signal so as to block a component having a frequency determined in accordance with the signal KIND_TONE. Although the notch filters 21 and 22 act in the similar manner to those in the second embodiment, those in the third embodiment is different from those in the second embodiment in a point that two kinds of signal are removed when a signal KIND_TONE indicates a DTMF signal. A band is removed in accordance with a DTMF signal, for example, by selecting a filter for "high group" and a filter for "low group" (these are cascade connected) which are determined in accordance with a signal KIND_TONE, among a plurality of notch filters which are prepared for the "high group" and the "low group" in advance. Further, the method of structure for blocking the DTMF signal band is not limited to this method.

In the third embodiment, the signal kind judging unit 16B also outputs the signal KIND_TONE to the filter state judging unit 31. Further, the signal kind judging unit 16B outputs a tone end signal TEND to the filter state judging unit 31a when a signal from the tone-like character judging unit 15B changes from a signal TON notifying that the input signal has a tone-like character to a signal TOFF notifying that the input signal has no tone-like character.

The filter state judging unit 31 operates in accordance with the output signals KIND_TONE and TEND from the signal kind judging unit 16B and the output signal from the echo-cancellation-amount calculator 32, as follows.

The filter state judging unit 31 updates the output signal from the echo-cancellation-amount calculator 32 at a predetermined time period and holds the updated value, when no signal KIND_TONE is supplied from the signal kind judging unit 16B, that is, during a period of time in which the input signal from the receiving input terminal Rin has no tone-like character. The signal is updated and held every 20 ms, for example, but an update interval is not limited to this example.

On the other hand, when receiving the signal KIND_TONE from the signal kind judging unit 16B, the filter state judging unit 31 categorizes the output signal from the echo-cancellation-amount calculator 32 into the following Conditions 1 to 4 to operate.
Condition 1: $ACANC(n) \geqq E\_ACANC(dB)$
Condition 2: $ACANC(n) < E\_ACANC(dB)$ Further, a threshold parameter E_ACANC defining Conditions 1 and 2 may be 20 dB, for example. However, a value of the threshold parameter E_ACANC is not limited to this example.

When Condition 1 holds, that is, when an amount of echo cancellation is large, the filter state judging unit 31 outputs a signal ADP_STP to the coefficient controller 17B in order to induce to stop the update of the coefficient of the adaptive filter 18. The coefficient controller 17B outputs the signal ADP_STP to the adaptive filter 18 through the double talk detector 14B to cause the adaptive filter 18 to stop the update of the coefficient of the adaptive filter 18.

When a period of tone signal ends and the filter state judging unit 31 receives the signal TEND from the signal kind judging unit 16B, the filter state judging unit 31 temporarily stops holding and updating of the amount of echo cancellation ACANC(n) and waits for the next period of updating of the amount of echo cancellation ACANC. Then, the echo-cancellation-amount calculator 32 newly calculates another amount of echo cancellation ACANC(n+1) and outputs it to the filter state judging unit 31, and the filter state judging unit 31 compares the amount of echo cancellation ACANC(n+1) with the amount of echo cancellation ACANC(n) which was previously held. That is, an amount of echo cancellation ACANC(.) before and after the tone signal is input to the echo canceller 12B are compared. "(.)" indicates an arbitrary number n. Then, judgment in accordance with Conditions 3 and 4 which are described above are performed subsequent to that in accordance with Condition 1 and thus the operation are implemented in accordance with each of results of the judgment.

On the other hand, when Condition 2 holds, that is, when the amount of echo cancellation is small, the filter state judging unit 31 does not output to the coefficient controller 17B a signal ADP_STP which induces to stop the update of the coefficient of the adaptive filter 18.

The filter state judging unit 31 judges the following Conditions 3 and 4 and differently operates in accordance with results of the judgment. In Conditions 3 and 4, $\Delta 1$ may be 3 dB and $\Delta 2$ may be 0 dB, but these are not limited to these values.
Condition 3: $\Delta 2 < ACANC(n+1) < ACANC(n) - \Delta 1$
Condition 4: $ACANC(n+1) < \Delta 2$ When Condition 3 holds, that is, when the tone signal has been input and the amount of echo cancellation is considerably less than that before the input, the filter state judging unit 31 outputs a coefficient-update inducing signal ADP_F to the coefficient controller 17B.

When Condition 4 holds, that is, when the amount of echo cancellation becomes negative because of the echo removal operation, a coefficient reset signal ADP_RST is output to the coefficient controller 17B.

Further, when neither Condition 3 nor Condition 4 holds, the filter state judging unit 31 outputs no signal to the coefficient controller 17B.

A modified Condition 3 which will be described below may be available as a substitute for the above-described Condition 3. In modified Condition 3, ACANC(n) is used as a substitute for the lower-limit fixed value $\Delta 2$ so as to provide upper and lower margins.
Modified Condition 3: $ACANC(n) - \Delta 3 < ACANC(n+1) < ACANC(n) - \Delta 1$ When receiving the coefficient reset signal ADP_RST from the filter state judging unit 31, the coefficient controller 17B outputs a reset signal RST to the double talk detector 14B. The reset signal RST passes through the double talk detector 14B to be input to the adaptive filter 18. The adaptive filter 18 resets the filter coefficient and then restarts the update of the coefficient. Although both of the double talk detector 14B and the adaptive filter 18 are reset in this example, it is also possible to reset the adaptive filter 18 only.

When receiving the coefficient-update inducing signal ADP_F from the filter state judging unit 31, the coefficient controller 17B resets the double talk detector 14B but does not reset the adaptive filter 18 to control to force coefficient update operation.

Although the coefficient controller 17B controls the adaptive filter 18 through the double talk detector 14B in the third embodiment, the coefficient controller 17B may control the adaptive filter 18 and the double talk detector 14B individually.

It will be explained how the problem 4 in the echo canceller of Patent Document 1 is solved by the operation in the third embodiment. The explanation is based on combinations of whether a convergence condition of the adaptive filter of the echo canceller is good or bad at the time of transfer and whether a change in an echo path characteristic before and after the transfer is large or small, as has been described in the portion of the problem.

The most typical example of extension transfer is that a far-end speaker (a speaker of the calling party in FIG. 9) which is not shown in the drawing operates to transfer through the use of push buttons, thereby outputting a DTMF signal, and then a telephone of the called party is changed from the telephone 9-1 to the telephone 9-2 through transferring function of a private branch exchange device (PBX) 6B. That is, it is a case where a push button (such as an extension number) is operated to appoint the telephone 9-2 which is different from the telephone 9-1, a call of which is firstly established, and then the call is connected to the telephone 9-2.

(Extension Transfer Case A)

An extension transfer case A is a case where the adaptive filter 18 insufficiently converges and response characteristics of the hybrid circuits 8-1 and 8-2 before and after the transfer are almost the same.

The extension transfer case A is a case where the speakers have a telephone conversation for a while before the transfer and the convergence of the adaptive filter 18 is in progress due to their voices, or a case where the coefficient is disturbed in some degree before the tone detection, for example.

When the adaptive filter 18 insufficiently converges, the far-end speaker requests the connection to the different telephone 9-2 by operating a push button (inputting a DTMF signal) and the like.

A DTMF signal received through the receiving input terminal Rin is input to the notch filter 22 and the tone-like character judging unit 15B as well as is supplied through the receiving output terminal Rout as it is to the D/A converter 7.

The tone-like character judging unit 15B detects a tone-like character. In accordance with the output of the tone-like character judging unit 15B, the signal kind judging unit 16B outputs a signal KIND_TONE. Then, each of the notch filters 21 and 22 blocks the passage of a frequency corresponding to the signal KIND_TONE.

As a result, the notch filter 21 blocks the DTMF signal while the DTMF signal is being generated. Therefore, this state is the same as a state when the adaptive filter 18 and the double talk detector 14B do not receive the DTMF signal. For this reason, if the DTMF signal is being input to the receiving input terminal Rin for a long time, a coefficient of the adaptive filter 18 is not disturbed, but the a coefficient does not optimally converge.

The extension transfer case A is a case where convergence of the adaptive filter 18 is insufficient. Since an amount of echo cancellation is small, Condition 2 holds (a case where Condition 1 holds will be described below). When the DTMF signal ends, the signal kind judging unit 16B outputs a tone end signal TEND. When receiving the signal TEND, the filter state judging unit 31 compares an amount of echo cancellation ACANC(n) which was previously held and an amount of echo cancellation ACANC(n+1) which is newly output from the echo-cancellation-amount calculator 32. In the extension transfer case A, since the characteristic of the hybrid circuit 8-1 and the characteristic of the hybrid circuit 8-2 are almost the same, the following Equation is obtained as a result of the update of the coefficient by the adaptive filter 18:

$$ACANC(n+1) \geq ACANC(n)$$

Accordingly, the coefficient controller 17B outputs no signal.

When Condition 1 holds, the filter state judging unit 31 temporarily stops updating a coefficient of the adaptive filter 18 through the use of the coefficient controller 17B. Holding of Condition 1 means that the characteristics of the hybrid circuits have already been estimated by the voice signals before the DTMF signal. Since the extension transfer case A is a case in which the characteristic of the hybrid circuit 8-1 and the characteristic of the hybrid circuit 8-2 are the same before and after the transfer, it is desirable that the adaptive filter 18 continues to update a coefficient and the coefficient controller 17B outputs no signal. As a result, the adaptive filter 18 and the double talk detector 14B can perform usual echo cancellation and can cancel echoes without degradation in echoes before and after generation of a tone signal, as desired.

(Extension Transfer Case B)

An extension transfer case B is a case where the adaptive filter 18 insufficiently converges and the characteristics of the hybrid circuits 8-1 and 8-2 change before and after the transfer.

In the extension transfer case B, the elements similarly operates as those in the extension transfer case A from when a DTMF signal ends and the signal kind judging unit 16B outputs a tone end signal TEND to when the filter state judging unit 31 receives the signal TEND and compares an amount of echo cancellation ACANC(n) previously held, with another amount of echo cancellation ACANC(n+1) newly output from the echo-cancellation-amount calculator 32.

When receiving a signal KIND_TONE from the signal kind judging unit 16B, the filter state judging unit 31 judges that Condition 1 or Condition 2 holds in accordance with the output from the echo-cancellation-amount calculator 32. Since the adaptive filter 18 insufficiently converges, Condition 2 holds in most cases (a case where Condition 1 holds will be described later) in the extension transfer case B.

Moreover, in the extension transfer case B, after the transfer, a response characteristic of the hybrid circuit changes from the characteristic of the hybrid circuit 8-1 to the characteristic of the hybrid circuit 8-2, where both of the characteristics are different from each other. When the adaptive filter 18 updates a coefficient, a target for echo-path estimation has changed from the hybrid circuit 8-1 to the hybrid circuit 8-2. As a matter of course, a pseudo echo generated in the adaptive filter 18 is considered to be undesired and it causes:

$$ACANC(n+1) < ACANC(n),$$

in most cases, $$ACANC(n+1) < 0.$$

Thus, a result of the judgment by the filter state judging unit 31 indicates holding of either of Condition 1 or Condition 2, a subsequent condition judgment is either Condition 3 or Condition 4 without exception. Further, the double talk detector 14B improperly judges an echo after change of the path as a near-end speaker signal because of abrupt degradation in an amount of echo cancellation, judges that a double-talk state occurs, and stops updating a coefficient of the adaptive filter 18.

As has been described above, the filter state judging unit 31 judges whether the change in the amount of echo cancellation ACANC before and after the reception of the output TEND from the signal kind judging unit 16B conforms to Condition 3 or Condition 4, firstly resets the double talk detector 14B and then recovers from the improper judgment by the double talk detector 14B. The filter state judging unit 31 then controls the adaptive filter 18 and the control is switched for Condition 3 or Condition 4, as described below.

a) A Case where Condition 3 Holds.

Holding of Condition 3 means that the amount of echo cancellation ACANC degrades within a predetermined permissible range. Therefore, some echoes can be canceled at this time, but it is preferable to implement further convergence for optimum echo-path estimation. The filter state judging unit 31 supplies a coefficient-update inducing signal ADP_F to the coefficient controller 17B, thereby causing the adaptive filter 18 to update a filter coefficient of the adaptive filter 18.

b) A Case where Condition 4 Holds.

Holding of Condition 4 when a parameter Δ2 in Condition 4 is, for example, 0 dB, means that the amount of echo cancellation ACANC is negative, that is, echo removal is in failure so that echoes are enhanced rather than cancelled. At this time, it is desirable for optimum echo-path estimation to abandon coefficient of the adaptive filter 18 once and then to implement reconvergence. Therefore, the coefficient controller 17B outputs a coefficient reset signal ADP_RST to the adaptive filter 18 through the double talk detector 14B, resets a filter coefficient and then restarts the update of a coefficient. In the third embodiment, although the adaptive filter 18 is reset through the double talk detector 14B, the coefficient controller 17B may reset the adaptive filter 18 directly.

Since the adaptive filter 18 is controlled in accordance with the above-mentioned Condition 3 and Condition 4, even if the characteristic of the hybrid circuit change before and after the transfer, the echo canceller 12B promptly follows again the characteristic of the hybrid circuit 8-2 which is newly connected and therefore a call without echo can be promptly realized.

(Extension Transfer Case C)

An extension transfer case C is a case where the adaptive filter 18 sufficiently converges and the characteristics of the hybrid circuits before and after transfer are almost the same. In the extension transfer case C, the adaptive filter 18 sufficiently converges and Condition 1 holds in the filter state judging unit 31. An echo path which has been estimated covers the whole voice-frequency band, and not only echoes in a voice signal but also echoes included in a tone signal can be removed as a matter of course. On the other hand, an echo cancellation residual "res" is almost a value of 0 and accordingly a coefficient-update amount in Equation (1) is also a value of 0. Thus, even if a tone signal is received, it is almost the same that the update of a coefficient stops.

In an exceptional case where a DTMF signal is being input for a longtime (e.g., 1 minute), a coefficient of the adaptive filter 18 may be gradually damaged. In the extension transfer case C, it is considered to avoid such a problem.

As has been described above, a combination of the filter state judging unit 31, the signal kind judging unit 16B and the notch filters 21 and 22 performs the function. When Condition 1 holds in a state that a signal KIND_TONE is output from the signal kind judging unit 16B, the filter state judging unit 31 outputs, to the coefficient controller 17B, a signal ADP_STP which induces to stop the update of the coefficient of the adaptive filter 18. Accordingly, the update of the coefficient of the adaptive filter 18 is stopped, the update of the coefficient is restarted after the transfer and therefore echoes can be continuously removed without problem.

The operation in accordance with Condition 3 and Condition 4 are subsequent also in the extension transfer case C, but the characteristics of the hybrid circuits are considered to be unchanged before and after the transfer in the extension transfer case C. For this reason, the hybrid circuit 8-1 and the hybrid circuit 8-2 are almost the same in view of the response characteristic, a coefficient of the adaptive filter 18 is not disturbed and there is no degradation in an amount of echo cancellation ACANC before and after the transfer, if the DTMF signal is being input for not so long time. Accordingly, there is no problem that the echo canceller 12B continues operation as it is.

Further, even if the DTMF signal is being input for a long time, the filter state judging unit 31 which has received the output signal KIND_TONE from the signal kind judging unit 16B prevents subsequent disturbance in a coefficient of the adaptive filter 18. In an unlikely event that the tone-kind judgment is delayed and it causes a delay in stopping the update of the coefficient of the adaptive filter 18 by the filter state judging unit 31 in accordance with the signal KIND_TONE, a coefficient of the adaptive filter 18 is disturbed and the amount of echo cancellation ACANC degrades after the transfer. Accordingly, the filter state judging unit 31 receives the signal TEND from the signal kind judging unit 16B after the end of the DTMF signal, then judges using Conditions 3 and 4 of the amount of echo cancellation ACANC again and operates in a similar manner to the extension transfer cases A and B thereafter. That is, after the transfer at worst, the adaptive filter 18 can be promptly reconverged and an echo can be removed, in a similar manner to the extension transfer cases A and B described above.

(Extension Transfer Case D)

An extension transfer case D is a case where the adaptive filter 18 sufficiently converges and the characteristics of the hybrid circuits change before and after the transfer. In this extension transfer case, since the echo canceller 12B sufficiently converges before the transfer, Condition 1 holds.

Therefore, as has been described above, in accordance with the output of the filter state judging unit 31, the coefficient controller 17B temporarily stops updating a coefficient of the adaptive filter 18. However, since Condition 3 or Condition 4 holds after a DTMF signal passes, the adaptive filter 18 accordingly restarts to converge; the adaptive filter 18 promptly starts reconvergence after the transfer and thereby an echo can be removed.

<C-3> Effects in Third Embodiment

As has been detailed described above, according to the echo canceller of the third embodiment, even if a tone signal such as a dial tone is output from the receiving input terminal and an accommodated telephone outputs a DTMF signal in an opposite direction, the tone detector which uses the outputs from the echo canceller correctly distinguishes the DTMF signal and specifies a phone number to make a telephone call. Moreover, according to the echo canceller of the third embodiment, even if in a case of a transfer through pushbutton operation, the echo-path estimation can be promptly implemented again and less degradation in efficiency due to a double talk is realized, and, even if an initial delay of an echo path is small, the prompt reconvergence and an echo-free telephone conversation of fine quality can be realized. Furthermore, according to the echo canceller of the third embodiment, echo cancellation efficiency does not degrades due to the extension transfer if it is applied to a big-size system in which the extension transfer and the like are performed, and therefore an echo canceller which can provide excellent voice quality can be realized.

《D》Fourth Embodiment

An echo canceller of the fourth embodiment of the present invention will be described with reference to the drawings. The echo canceller of the fourth embodiment solves a problem which arises in a call between human beings when voices of the human beings accidentally have a tone-like character.

<D-1> Structure in Fourth Embodiment

Figure 11:
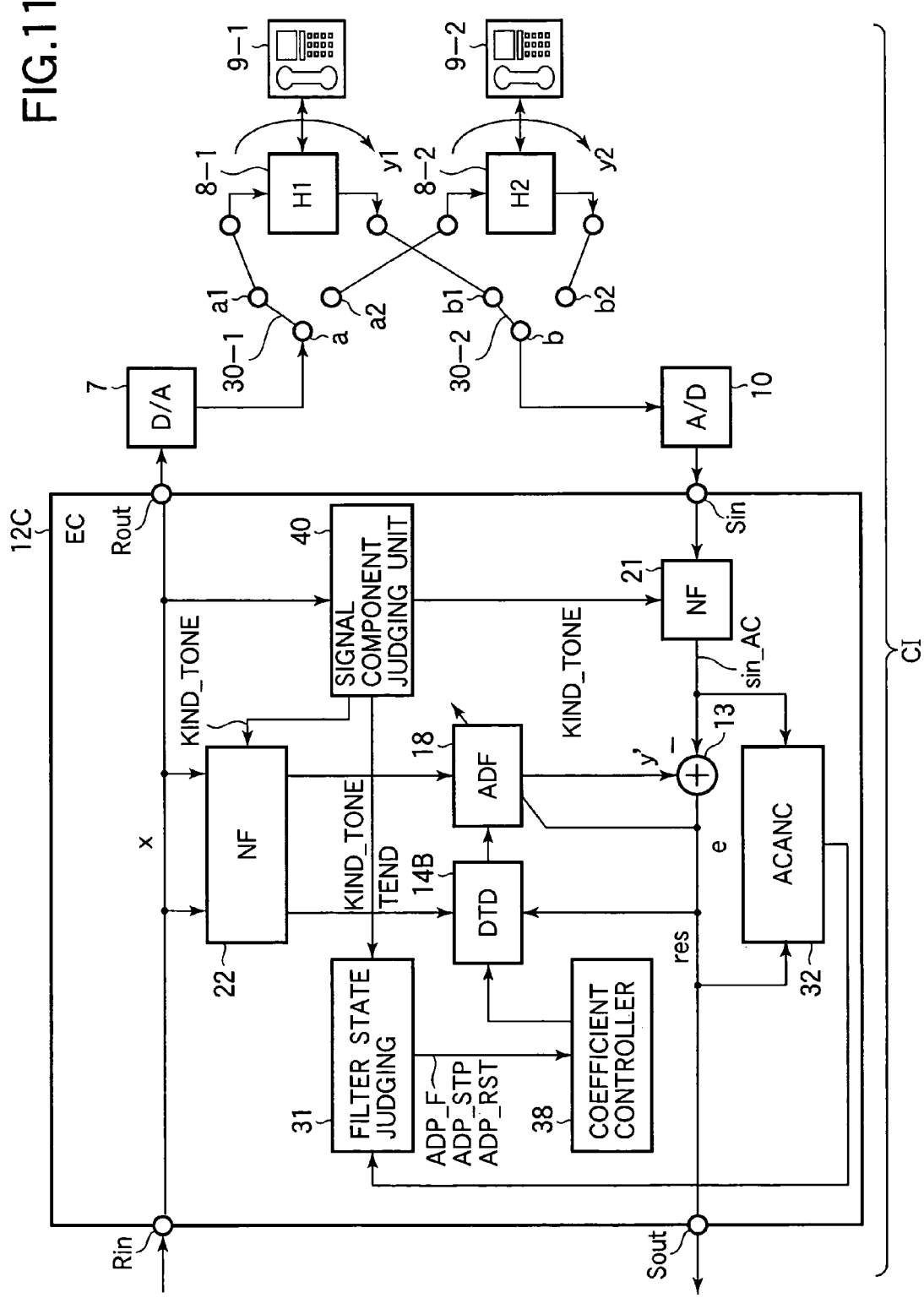
FIG. 11 is a block diagram showing a structure of an echo canceller and its peripheral equipment in the fourth embodiment of the present invention.

FIG. 11 is a block diagram showing a structure of the echo canceller of the fourth embodiment of the present invention and its peripheral equipment. The parts in FIG. 11 that are the same as or correspond to the parts in FIG. 9 are assigned identical reference characters.

As shown in FIG. 11, an echo canceller 12C of the fourth embodiment differs from the echo canceller of the third embodiment in a point that the echo canceller 12C includes a signal component judging unit 40, as a substitute for the tone-like character judging unit 15B and the signal kind judging unit 16B in the third embodiment. Regarding the other points, the echo canceller of the fourth embodiment is the same as that in the third embodiment.

The signal component judging unit 40 generates a signal KIND_TONE and a signal TEND in accordance with an input signal supplied through the receiving input terminal Rin. A method of generating the signals will be described below.

<D-2> Operation in Fourth Embodiment

This embodiment will be described with a particular emphasis on differences between the echo canceller of the fourth embodiment and the echo canceller of the third embodiment.

The signal component judging unit 40 judges whether the input signal is a wideband signal (components of the input signal extend wideband) or not, regardless of that the input signal has a kind of a known call control signal (e.g., DT, DTMF, and the like) or other. The signal component judging unit 40 operates so as to judge such as a tone signal of 1500 Hz which is not a call control signal as a tone signal.

The judgment by the signal component judging unit 40 will be described below. The signal component judging unit 40 performs, for example, Fast Discrete Fourier Transform (FFT) on the input signal to resolve it into individual single frequency components. The input signal is converted to frequency components by using 256-point FFT, for example. If a sampling frequency of 16 kHz and the 256-point FFT are used, each of the frequency components can be calculated for 0 to 8 kHz band of the input signal by 128-resolution to determine a power spectrum $P\_f(k)$. In the fourth embodiment, a power $P\_min\_f$ of the minimum frequency $min\_f$ among power spectrums is considered to be a power level of a noise floor frequency and it is considered that "a frequency component is present" when the following Condition 5 is satisfied.

Condition 5: $P\_f(k) > P\_min\_f + \delta f$

Here, "$\delta f$" is an offset value for judgment. For example, 15 dB is available for "$\delta f$", but it is not limited to this example. A symbol "k" indicates the number of a frequency among the resolved frequencies and takes on 128 values of $0 \leq k \leq 127$.

The signal component judging unit 40 causes a built-in counter to count the number of a frequency $f(k)$ which satisfies Condition 5. When a result of the counting $C\_F$ is less than a threshold parameter TH_VOICE (i.e., $C\_F < TH\_VOICE$), the input signal is considered as an arbitrary tone signal and a signal KIND_TONE is supplied to the filter state judging unit 31. Although the threshold parameter TH_VOICE may be a value of 4, it is not limited to this value.

In the fourth embodiment, since it is not necessary to judge a kind of the tone signal, it is not necessary to store information for generating a signal KIND_TONE in advance and to refer to the stored information as in the first to third embodiments. A single matter of concern is whether a signal KIND_TONE is output or not.

If a signal KIND_TONE need be numbered in relation to the structure of the notch filters 21 and 22 and the filter state judging unit 31, a number which is not applied in FIG. 8 and FIG. 10 described above is used, for example.

In the fourth embodiment, since a frequency of a tone signal to be detected is not determined in advance, the notch filters 21 and 22 may be controlled to perform the filtering operation by providing them with a signal KIND_TONE which has frequency information.

The signal component judging unit 40 outputs a signal TEND which indicates the end of a tone signal to the filter state judging unit 31 when it changes from a state in which a tone signal is detected in accordance with Condition 5 as described above to a state in which further detection cannot be implemented.

<D-3> Effects in Fourth Embodiment

According to the echo canceller of the fourth embodiment, it enables to avoid the false convergence to an arbitrary tone signal which is not categorized as a call control signal (human voices accidentally having a tone-like character in telephone conversation between human beings, for example) and to avoid subsequent improper operation in the echo canceller.

Input of an arbitrary tone signal may occur in some rare cases such as when music of the same level as speaker's voices is playing as background sounds of one or both of the speakers, when a speaker sings during a telephone call, and when a voice-frequency characteristic of the speaker's voice unusually has a tone-like character. A frequency of the generated tone-like character signal is arbitrary regardless of whether it is a frequency of a call-control tone or not and known frequency lists cannot be referred. The echo canceller of the fourth embodiment including the signal component judging unit 40 detects a tone-like character of the input signal even if a frequency is arbitrary, and controls the adaptive filter and the double talk detector after the detection, in a similar manner to the echo canceller of the third embodiment. Therefore, according to the echo canceller of the fourth embodiment, false convergence of the adaptive filter can be avoided, prompt recovery from the false convergence can be realized even if an initial delay of an echo path is small, the double talk detector can recover from improper judgment and therefore an echo can be continuously cancelled without degradation.

《E》Fifth Embodiment

An echo canceller of the fifth embodiment of the present invention will be described with reference to the drawings. The echo canceller of the fifth embodiment can reduce its hardware size as compared with the echo cancellers of the third and fourth embodiments.

<E-1> Structure in Fifth Embodiment

Figure 12:
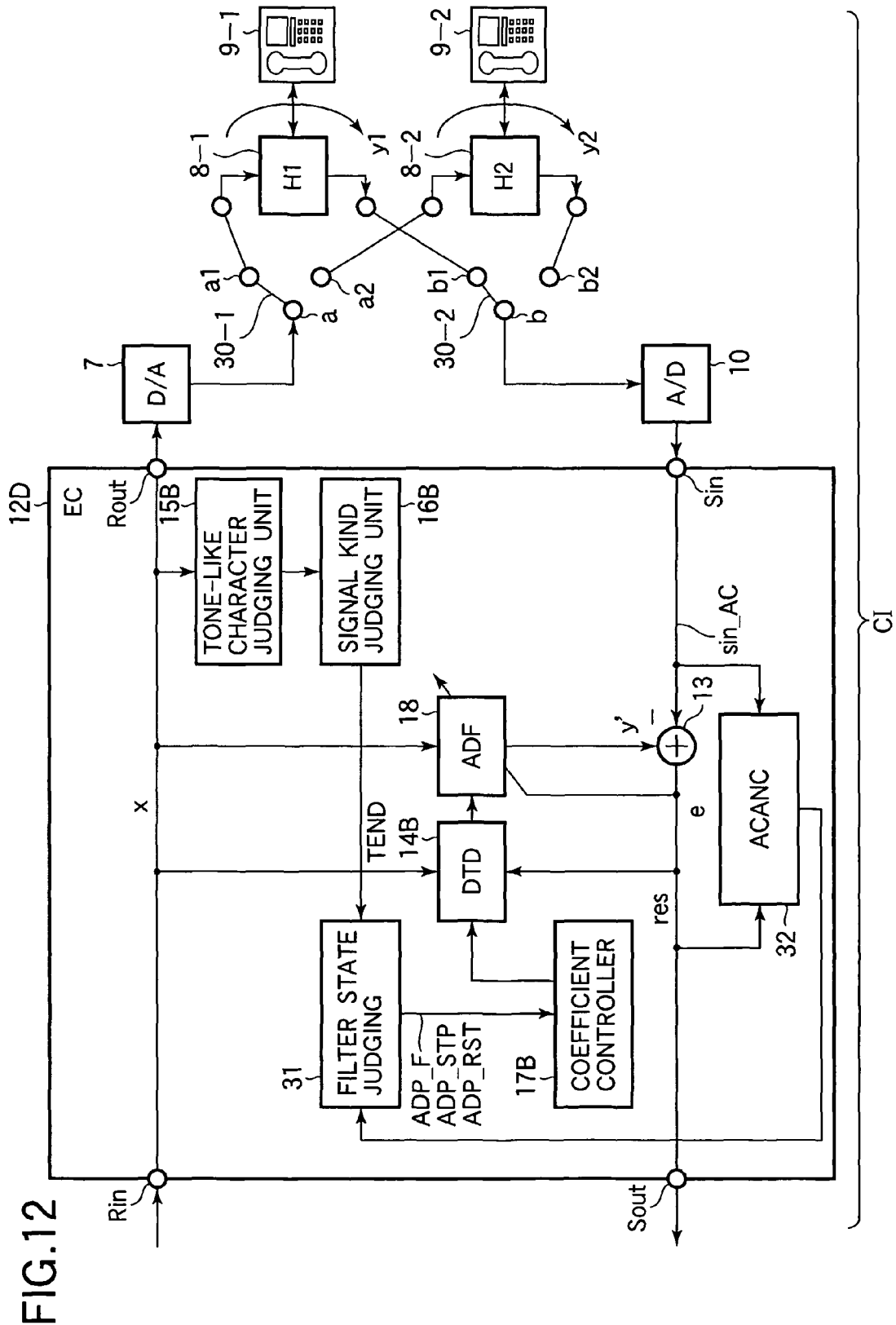
FIG. 12 is a block diagram showing a structure of an echo canceller and its peripheral equipment in the fifth embodiment of the present invention.

FIG. 12 is a block diagram showing a structure of the echo canceller of the fifth embodiment of the present invention and its peripheral equipment. The parts in FIG. 12 that are the same as or correspond to the parts in FIG. 9 are assigned identical reference characters. As shown in FIG. 12, an echo canceller 12D of the fifth embodiment differs from the echo canceller of the third embodiment in the points that the echo canceller 12D does not include the notch filters 21 and 22 in the third embodiment and a signal kind judging unit 16D differently functions.

E-2> Operation in Fifth Embodiment

The operation of the echo canceller 12D of the fifth embodiment will be described below, with a particular emphasis on difference from the operation of the echo canceller of the third embodiment.

A transfer which is performed between the telephones 9-1 and 9-2 of the called party will be described. The explanation concerns before and after the transfer and is based on a premise that a call has been already established between a telephone of the calling party which is not shown in the drawing and the telephone 9-1 of the called party.

The signal kind judging unit 16D outputs a signal TEND which indicates the end of a tone signal to the filter state judging unit 31 when it is switched from a signal TON notifying that an output of the tone-like character judging unit 15B has a tone-like character to a signal TOFF notifying that the output does not have a tone-like character.

When receiving the output TEND from the signal kind judging unit 16D, the filter state judging unit 31, in a similar manner to the third embodiment, judges Conditions 1 to 4 described above to obtain a result of judgment, outputs a signal ADP_F, ADP_STP or ADP_RST for controlling a coefficient to the coefficient controller 17B in accordance with the result of judgment and controls the update of a coefficient of the adaptive filter 18. In the absence of such a control, the adaptive filter 18 is subjected to a control by the double talk detector 14B to update a coefficient.

Transferring operation will be described below. Since in the fifth embodiment, it is not necessary to categorize detailedly the changes in response characteristics of the hybrid circuits and convergence conditions of the adaptive filter, contrary to the embodiments described above, the description will be collectively made.

A telephone conversation is made for a while before the transfer and convergence of the adaptive filter 18 is in progress due to voices. At this time, a far-end speaker who is not shown in the drawing requests to be connected to another telephone by inputting a DTMF signal and the like.

Then, the DTMF signal which is input from the receiving input terminal Rin, is input to the tone-like character judging unit 15B and, on the other hand, is input to the D/A converter 7 through the receiving output terminal Rout. At this time, the tone-like character judging unit 15B detects a tone-like character of the input signal, but the signal kind judging unit 16D outputs no signal. Accordingly, the filter state judging unit 31 also outputs no signal and the adaptive filter 18 continues to update a coefficient and removes echoes caused by the tone. At this time, although the coefficient of the adaptive filter 18 does not correspond to an echo path characteristic as described above, the coefficient is updated in such a way that the tone can be satisfactorily cancelled. Thus, the output from the adder 13 is decreased and a value of ERLE becomes large.

Next, after the input of the tone signal terminates, the signal kind judging unit 16D outputs a tone end signal TEND to the filter state judging unit 31.

When receiving the tone end signal TEND, the filter state judging unit 31 compares an amount of echo cancellation ACANC(n) which was previously held and an amount of echo cancellation ACANC(n+1) which is newly output from the echo-cancellation-amount calculator 32. In the present case, if the characteristic of the hybrid circuit (H1) 8-1 and the characteristic of the hybrid circuit (H2) 8-2 are the same, the coefficient of the adaptive filter 18 is so conveniently disturbed that only the tone signal is cancelled, at the point of time when the signal TEND is input, regardless of the convergence condition before and after the tone end signal TEND, and after that, Condition 2, 3 or 4 becomes satisfied due to an amount of echo cancellation in a subsequent ordinary voice signal. At this time, in accordance with Condition 3 or 4, the double talk detector 14B and the adaptive filter 18 are updated again in a similar manner to the third embodiment.

Further, the satisfaction of Condition 1 means that the coefficient has not been so disturbed due to a DTMF signal before and after the input timing of the signal TEND and echoes can be sufficiently cancelled through the use of the subsequent voice signal, that is, only in the extension transfer case C in which the adaptive filter 18 sufficiently converges in advance and the characteristics of the hybrid circuits do not change. At this time, it is preferable that the adaptive filter 18 continues to proceed the update of a coefficient. Since the coefficient controller 17B outputs no signal, the adaptive filter 18 and the double talk detector 14B performs normal echo canceling operation as it is desired and thereby can remove echoes without echo degradation before and after generation of a tone signal.

<E-3> Effects in Fifth Embodiment

In the echo canceller of the fifth embodiment, although the disturbance in the tone signal cannot be prevented, reconvergence can be performed regardless of whether an initial delay of an echo path is large or small by resetting the coefficient of the adaptive filter when the transfer is performed in most cases and resetting the double talk detector to avoid interruption of restarted update of a coefficient. Thus, according to the echo canceller of the fifth embodiment, although an echo occurs for a moment, prompt recovery from the false convergence can be realized and then reconvergence can be started. Further, since there is no need to provide a plurality of notch filters in advance, the hardware size of the echo canceller can be reduced.

《F》Other Embodiment

An echo canceller may be provided by combining of some of the technical ideas which can be combined in the embodiments described above with each other.

In the third and fourth embodiments, the echo-cancellation-amount calculator 32 calculating a square ratio between a signal at the input terminal of the adder 13 and a signal at the output terminal of the adder 13 is used in order to calculate an amount of echo cancellation ACANC(n). However, an output signal of the adder 13 and an output signal of the receiving input terminal Rin, or an output signal of the adder 13 and an input signal of the receiving output terminal Rout may be also available. In such a case, attenuation of the echo path itself may be added to the values Δ1 and Δ2 described in the third and fourth embodiments.

Further, in the fourth embodiment, although it is described that the signal component judging unit 40 uses FFT to detect an arbitrary tone frequency, it is not limited to this example. Any method other than the method using FFT may be applied to detect an arbitrary tone frequency.

Moreover, although a pair of notch filters is provided in the second to fourth embodiments, another structure may be available as long as it is a structure in which a notch filter is provided at an input stage of the adaptive filter.

Furthermore, although the elements are configured by hardware in the above explanation of the embodiments, some elements may be realized by software.

The echo cancellers of the first and second embodiments are provided in a VoIP terminal device and the echo cancellers of the third to fifth embodiments are provided in a PBX. However, a device which has the echo canceller of the present invention is not limited to these devices.

What is claimed is:

1. An echo canceller comprising:
an adaptive filter which generates a pseudo echo signal in accordance with a far-end input signal;
an echo cancellation means which subtracts the pseudo echo signal from a near-end input signal;
a tone-kind judgment means which judges whether the far-end input signal is a predetermined kind of tone signal or not, said tone-kind judgment means when judging that the far-end input signal is a predetermined kind of tone signal, also detecting an end of the tone signal;
an echo-cancellation-amount calculation means which calculates an amount of echo cancellation of a signal output from the echo cancellation means; and
an at-tone-input coefficient control means which causes the adaptive filter to stop update of a coefficient of the adaptive filter in accordance with satisfaction of a predetermined condition for the amount of echo cancellation, when the tone-kind judgment means judges that the far-end input signal is the predetermined kind of tone signal, the at-tone-input coefficient control means
comparing amounts of echo cancellation before and after timing that the tone-kind judgment means judges to be the end of the tone signal,
in accordance with a result of the comparison, causing the adaptive filter to restart the update of the coefficient after resetting the coefficient of the adaptive filter, or forcefully causing the adaptive filter to restart the update of the coefficient without resetting the coefficient of the adaptive filter, including
forcefully causing the adaptive filter to restart the update of the coefficient without resetting the coefficient of the adaptive filter, if a conditional expression, $\Delta 2 < ACANC(n+1) < ACANC(n) - \Delta 1$ holds, and
causing the adaptive filter to restart the update of the coefficient after resetting the coefficient of the adaptive filter, if another conditional expression, $ACANC(n+1) < \Delta 2$ holds,
where $ACANC(n)$ and $ACANC(n+1)$ denote the amounts of echo cancellation before and after timing that the tone-kind judgment means judges to be the end of the tone signal respectively, and $\Delta 1$ and $\Delta 2$ denote predetermined threshold values respectively.

2. An echo canceller comprising:
an adaptive filter which generates a pseudo echo signal in accordance with a far-end input signal;
an echo cancellation means which subtracts the pseudo echo signal from a near-end input signal;
a tone-kind judgment means which judges whether the far-end input signal is a predetermined kind of tone signal or not, the tone-kind judgment means when judging that the far-end input signal is a predetermined kind of tone signal, also detecting an end of the tone signal;
an echo-cancellation-amount calculation means which calculates an amount of echo cancellation of a signal output from the echo cancellation means;
an at-tone-input coefficient control means which causes the adaptive filter to stop update of a coefficient of the adaptive filter in accordance with satisfaction of a predetermined condition for the amount of echo cancellation, when the tone-kind judgment means judges that the far-end input signal is the predetermined kind of tone signal, the at-tone-input coefficient control means
comparing amounts of echo cancellation before and after timing that the tone-kind judgment means judges to be the end of the tone signal, and
in accordance with a result of the comparison, causing the adaptive filter to restart the update of the coefficient after resetting the coefficient of the adaptive filter, or forcefully causing the adaptive filter to restart the update of the coefficient without resetting the coefficient of the adaptive filter; and
a double-talk detection means which calculates a power ratio ERLE between a far-end input signal and an echo cancellation residual, thereby detecting a double-talk state,
wherein the at-tone-input coefficient control means compares the amounts of echo cancellation before and after timing when the tone-kind judgment means judged as the end of the tone signal, and in accordance with a result of the comparison, causes the adaptive filter to restart the update of the coefficient after resetting the coefficient of the adaptive filter, or forcefully causes the adaptive filter to restart the update of the coefficient without resetting the coefficient of the adaptive filter concurrently with resetting the double-talk detection means.

3. The echo canceller according to claim 1, further comprising a first notch filter which removes a frequency component of a predetermined kind of tone signal from the far-end input signal toward the adaptive filter when the tone-kind judgment means judges that the far-end input signal is the predetermined kind of tone signal, the first notch filter being disposed at an input stage of the adaptive filter.

4. The echo canceller according to claim 2, wherein the double-talk detection means receives the near-end input signal which has passed through the first notch filter.

5. The echo canceller according to claim 1, further comprising a second notch filter which removes a frequency component of a predetermined kind of tone signal from the near-end input signal toward the echo cancellation means when the tone-kind judgment means judges that the far-end input signal is the predetermined kind of tone signal, the second notch filter being disposed at an input stage of the echo cancellation means.

6. An echo canceller, comprising:
an adaptive filter which generates a pseudo echo signal in accordance with a far-end input signal;
an echo cancellation means which subtracts the pseudo echo signal from a near-end input signal;
a tone-kind judgment means which judges whether the far-end input signal is a predetermined kind of tone signal or not;
an echo-cancellation-amount calculation means which calculates an amount of echo cancellation of a signal output from the echo cancellation means;
an at-tone-input coefficient control means which causes the adaptive filter to stop update of a coefficient of the adaptive filter in accordance with satisfaction of a predetermined condition for the amount of echo cancellation, when the tone-kind judgment means judges that the far-end input signal is the predetermined kind of tone signal; and
an arbitrary tone judgment means which judges whether the far-end input signal is an arbitrary tone signal or not, as a substitute for the tone-kind judgment means which judges whether the far-end input signal is a predetermined kind of tone signal or not,
wherein the arbitrary-tone judgment means counts the number of a frequency f(k) which satisfies $$P\_f(k) > P\_\min\_f + \delta f$$

and judges that the far-end input signal is an arbitrary tone signal, if the counted number is less than a predetermined threshold value, where P_f(k) (k=1, . . . , K) denotes power spectrums which are powers of K frequency components of the far-end input signal, P_min_f denotes a power level of a noise floor frequency, which is a power of a minimum frequency among the power spectrums P_f(k), and δf denotes an offset value.

7. An echo canceller comprising:
an adaptive filter which generates a pseudo echo signal in accordance with a far-end input signal;
an echo cancellation means which subtracts the pseudo echo signal from a near-end input signal;
a tone-end judgment means which detects that the far-end input signal is a tone signal and judges an end of the tone signal;
an echo-cancellation-amount calculation means which calculates an amount of echo cancellation in a signal output from the echo cancellation means; and
an at-tone-end coefficient control means which causes the adaptive filter to stop an update of a coefficient of the adaptive filter in accordance with satisfaction of a predetermined condition for the amount of echo cancellation, when the tone-end judgment means judges that the tone signal ends
wherein the at-tone-end coefficient control means compares amounts of echo cancellation before and after timing when the tone-end judgment means judged as the end of the tone signal and, in accordance with a result of the comparison, causes the adaptive filter to restart the update of the coefficient after resetting the coefficient of the adaptive filter, or forcefully causes the adaptive filter to restart the update of the coefficient without resetting the coefficient of the adaptive filter, and
wherein the at-tone-end coefficient control means forcefully causes the adaptive filter to restart the update of the coefficient without resetting the coefficient of the adaptive filter, if a conditional expression, $$\Delta 2 < ACANC(n+1) < ACANC(n) - \Delta 1 \text{ holds, and}$$

causes the adaptive filter to restart the update of the coefficient after resetting the coefficient of the adaptive filter, if another conditional expression, ACANC(n+1)<Δ2 holds,
where ACANC(n) and ACANC(n+1) denote amounts of echo cancellation before and after timing when the tone-kind judgment means judged as the end of the tone signal respectively, and Δ1 and Δ2 denote predetermined threshold values respectively.

8. The echo canceller according to claim 7, wherein the predetermined condition used by the at-tone-end coefficient control means is a condition that an amount of echo cancellation at that time is not less than a predetermined threshold value.

9. An echo canceller, comprising:
an adaptive filter which generates a pseudo echo signal in accordance with a far-end input signal;
an echo cancellation means which subtracts the pseudo echo signal from a near-end input signal;
a tone-end judgment means which detects that the far-end input signal is a tone signal and judges an end of the tone signal;
an echo-cancellation-amount calculation means which calculates an amount of echo cancellation in a signal output from the echo cancellation means;
an at-tone-end coefficient control means which causes the adaptive filter to stop an update of a coefficient of the adaptive filter in accordance with satisfaction of a predetermined condition for the amount of echo cancellation, when the tone-end judgment means judges that the tone signal ends,
wherein the at-tone-end coefficient control means compares amounts of echo cancellation before and after timing when the tone-end judgment means judged as the end of the tone signal and, in accordance with a result of the comparison, causes the adaptive filter to restart the update of the coefficient after resetting the coefficient of the adaptive filter, or forcefully causes the adaptive filter to restart the update of the coefficient without resetting the coefficient of the adaptive filter; and
a double-talk detection means which calculates a power ratio ERLE between a far-end input signal and an echo cancellation residual, thereby detecting a double-talk state,
wherein the at-tone-end coefficient control means compares the amounts of echo cancellation before and after timing when the tone-end judgment means judged as the end of the tone signal, and in accordance with a result of the comparison, causes the adaptive filter to restart the update of the coefficient after resetting coefficient of the adaptive filter, or forcefully causes the adaptive filter to restart the update of the coefficient without resetting the coefficient of the adaptive filter concurrently with resetting the double-talk detection means.

10. The echo canceller according to claim 9, wherein the predetermined condition used by the at-tone-end coefficient control means is a condition that an amount of echo cancellation at that time is not less than a predetermined threshold value.

11. The echo canceller according to claim 6, further comprising a second notch filter which removes a frequency component of a predetermined kind of tone signal from the near-end input signal toward the echo cancellation means when the tone-kind judgment means judges that the far-end input signal is the predetermined kind of tone signal, the second notch filter being disposed at an input stage of the echo cancellation means.

12. The echo canceller according to claim 6, further comprising:
a first notch filter which removes a frequency component of a predetermined kind of tone signal from the far-end input signal toward the adaptive filter when the tone-kind judgment means judges that the far-end input signal is the predetermined kind of tone signal, the first notch filter being disposed at an input stage of the adaptive filter.

13. The echo canceller according to claim 6, wherein the double-talk detection means receives the near-end input signal which has passed through the first notch filter.

14. The echo canceller according to claim 2, further comprising:
a second notch filter which removes a frequency component of a predetermined kind of tone signal from the near-end input signal toward the echo cancellation means when the tone-kind judgment means judges that the far-end input signal is the predetermined kind of tone signal, the second notch filter being disposed at an input stage of the echo cancellation means.

15. The echo canceller according to claim 2, further comprising a first notch filter which removes a frequency component of a predetermined kind of tone signal from the far-end input signal toward the adaptive filter when the tone-kind judgment means judges that the far-end input signal is the predetermined kind of tone signal, the first notch filter being disposed at an input stage of the adaptive filter.

16. The echo canceller according to claim 2, wherein the predetermined condition used by the at-tone-input coefficient control means is a condition that the amount of echo cancellation at that time is not less than a predetermined threshold value.

17. The echo canceller according to claim 1, wherein the predetermined condition used by the at-tone-input coefficient control means is a condition that the amount of echo cancellation at that time is not less than a predetermined threshold value.

* * * * *